US012045546B2

(12) United States Patent
Nomura et al.

(10) Patent No.: US 12,045,546 B2
(45) Date of Patent: Jul. 23, 2024

(54) ORIENTATION OPTIMIZATION IN COMPONENTS FABRICATED WITH ANISOTROPIC MATERIAL PROPERTIES

(71) Applicant: TOYOTA MOTOR ENGINEERING & MANUFACTURING NORTH AMERICA, INC., Plano, TX (US)

(72) Inventors: Tsuyoshi Nomura, Novi, MI (US); Atsushi Kawamoto, Nagakute (JP); Yoshihiro Iwano, Toyota (JP)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 847 days.

(21) Appl. No.: 16/405,754

(22) Filed: May 7, 2019

(65) Prior Publication Data
US 2020/0356638 A1 Nov. 12, 2020

(51) Int. Cl.
G06F 30/20 (2020.01)
G06F 30/23 (2020.01)
(Continued)

(52) U.S. Cl.
CPC ............ G06F 30/20 (2020.01); G06F 30/23 (2020.01); G06F 2111/04 (2020.01); G06F 2111/10 (2020.01); G06F 2111/20 (2020.01)

(58) Field of Classification Search
CPC ...... G06F 30/20; G06F 30/00; G06F 2111/04; G06F 2111/20; G06F 2111/10
See application file for complete search history.

(56) References Cited

U.S. PATENT DOCUMENTS 5,539,310 A * 7/1996 Basser ............. G01R 33/56341
324/309
8,271,237 B2 9/2012 Borrvall
(Continued)

FOREIGN PATENT DOCUMENTS

CN 105913420 A 8/2016

OTHER PUBLICATIONS

Zhou, Yuqing, Tsuyoshi Nomura, and Kazuhiro Saitou. "Multi-component topology and material orientation design of composite structures (MTO-C)." Computer Methods in Applied Mechanics and Engineering 342 (2018): 438-457. (Year: 2018).*

(Continued)

Primary Examiner — Boris Gorney
Assistant Examiner — Joshua E. Jensen
(74) Attorney, Agent, or Firm — Oblon, McClelland, Maier & Neustadt, L.L.P.

(57) ABSTRACT

A method for optimizing orientations of an anisotropic material in a component. For example, the method overcomes the non-uniqueness and gimbal locking problems associated with using Euler angles to define the orientation by instead parameterizing the orientation using an orientation tensor that is a self-dyadic product of a direction vector. To avoid non-linear constraints in the mathematical design variables used in the optimization, isoparametric shape functions map the mathematical design variables to physical design variables, and the mapping ensures that various constraints associated with tensor invariants of the orientation tensor are satisfied even though these constraints are not directly imposed on the mathematical design variables. The physical design variables are used to model the component, whereas optimization is performed using the mathematical design variables. Thus, optimization is greatly simplified by (Continued)

removing the tensor-invariant constraints from the optimization step to the mapping step.

20 Claims, 24 Drawing Sheets

(51) Int. Cl.
  *G06F 111/04* (2020.01)
  *G06F 111/10* (2020.01)
  *G06F 111/20* (2020.01)

(56) References Cited

U.S. PATENT DOCUMENTS

| | | | |
|---|---|---|---|
| 9,471,377 | B2 | 10/2016 | Baskaran et al. |
| 9,568,580 | B2 | 2/2017 | Dale et al. |
| 9,576,088 | B2 | 2/2017 | Nomura et al. |
| 9,919,465 | B1 | 5/2018 | Tseng et al. |
| 2011/0052063 | A1* | 3/2011 | McAuley ............ G06V 10/809 382/224 |
| 2014/0297703 | A1* | 10/2014 | Goldstein ............ H04N 19/90 708/201 |
| 2015/0253410 | A1 | 9/2015 | Warfield et al. |
| 2019/0138670 | A1* | 5/2019 | Bandara ............ G06F 30/20 |

OTHER PUBLICATIONS

Nomura, Tsuyoshi, et al. "General topology optimization method with continuous and discrete orientation design using isoparametric projection." International Journal for Numerical Methods in Engineering 101.8 (2015): 571-605. (Year: 2015).*

Zhou, Yuqing, and Kazuhiro Saitou. "Gradient-based multi-component topology optimization for additive manufacturing (MTO-A)." International Design Engineering Technical Conferences and Computers and Information in Engineering Conference. vol. 58127. American Society of Mechanical Engineers, 2017. (Year: 2017).*

Lee, Jaewook, et al. "Topology optimization of anisotropic magnetic composites in actuators using homogenization design method." Structural and Multidisciplinary Optimization 60.4 (2019): 1423-1436. (Year: 2019).*

Otomori, Masaki. "Inverse design of dielectric materials by topology optimization." Progress In Electromagnetics Research 127 (2012): 93-120. (Year: 2012).*

Hao, Peng, et al. "Adaptive gradient-enhanced kriging model for variable-stiffness composite panels using Isogeometric analysis." Structural and Multidisciplinary Optimization 58 (2018): 1-16. (Year: 2018).*

Nomura, T., et al. "Simultaneous optimization of topology and orientation of anisotropic material using isoparametric projection method" Proceedings of the 11th World Congress on Structural and Multidisciplinary Optimization, pp. 7-12 (Jun. 2015).

Arciniega, R.A., et al. "Tensor-based finite element formulation for geometrically nonlinear analysis of shell structures" Computer Methods in Applied Mechanics and Engineering, 196(4-6), pp. 1048-1073 (2007).

* cited by examiner

ORIENTATION OPTIMIZATION IN COMPONENTS FABRICATED WITH ANISOTROPIC MATERIAL PROPERTIES

BACKGROUND

Field

Embodiments described herein relate generally to material optimization of the configuration of mechanical components having an anisotropic material property. Material optimization is accelerated by enforcing tensor constraints for the anisotropic material property via coordinate projections, thereby reducing the number of constraints explicitly expressed in a numerical method performing constrained optimization. For example, fiber composites having an anisotropic elasticity tensor can be optimized in terms of material orientation and distribution to minimize mechanical compliance (e.g., maximized stiffness) of the component for a given load distribution. This optimization can help reduce the weight of motorized vehicles, reducing fuel consumption and improving performance.

Description of the Related Art

The background description provided herein is for the purpose of generally presenting the context of the disclosure. Work of the presently named inventors, to the extent the work is described in this background section, as well as aspects of the description that cannot otherwise qualify as prior art at the time of filing, are neither expressly nor impliedly admitted as prior art against the present disclosure.

Making mobile machines such as automobiles lighter weight can be important for preserving the environment by reducing energy consumption. Decreasing weight can also improve performance and make automobiles more affordable. Composite materials are one technology that can decrease the weight of automotive and other machine powered vehicles. Especially, anisotropic composites, such as unidirectional fiber reinforced composites, have great potential due to their superior stiffness-to-mass ratio when compared with isotropic composites.

In order to make anisotropic composites work effectively in structural parts, stress orientation and material orientation should be aligned appropriately at each point in the structure. Therefore, the resulting structure has to be made of a composite which axis varies spatially point-to-point in the structure.

Variable Axial Composites (VACs) are material in which the orientation is fabricated to spatially vary point-to-point within the structure. Thus, VACs can be designed to have a stress orientation and material orientation that is aligned point-to-point within the structure. Realization of VACs involves challenges in both design of the structure and fabrication. Existing design methods are insufficient for general optimization the spatial variation of the material orientation in VACs. For example, topology design methods that work well when applied to isotropic materials, tend to fail when extended to designing anisotropic materials. Further, existing methods fail to incorporate orientation in a computationally efficient manner.

Conventional methods have been computationally inefficient and/or problematic. For example, Continuous Fiber Angle Optimization performed using Euler angles are susceptible to non-uniqueness and gimbal locking problems. Additionally, Free Material Optimization uses tensor elements as control variables resulting in computational inefficiency that arise from a large number of non-linear constraints imposed on the control variables to enforce tensor invariants.

Accordingly, improved methods for designing VAC structures are desired.

SUMMARY

One object of the present disclosure is to provide a more computationally efficient and robust method to optimal design components comprising anisotropic materials, such as fiber composites, in which an orientation of the anisotropic material properties can be controlled.

To that end among others, the present disclosure provides a method of designing a component, which comprises an anisotropic material, by optimizing, as a function of position, an orientation of the anisotropic material. The method includes: (i) initializing mathematical design variables, the mathematical design variables including a first orientation tensor; (ii) mapping the first orientation tensor to a second orientation tensor of physical design variables, wherein the mapping ensures that the second orientation tensor substantially satisfies a first constraint independently of whether the first orientation tensor satisfies the first constraint; (iii) calculating, using the physical design variables, a value of an objective function F, which represents a quantity to be optimized, by simulating a performance of the component when the anisotropic material is oriented according to the second orientation tensor, and (iv) iteratively adjusting the mathematical design variables to optimize the value of the objective function F, the first constraint being indirectly imposed on the optimization of the value of the objective function F through the mapping from the mathematical design variables to the physical design variables rather than being directly applied to the mathematical design variables.

Because the constraint is enforced by the mapping from the first orientation tensor to the second orientation tensor, rather than being directly imposed on the first orientation tensor, the optimization can be performed on the mathematical design variables without expressly accounting for the constraint. Therefore, the optimization step is simplified such that it can be performed using computationally efficient non-linear programming algorithms (e.g., the sequential quadratic programming (SQP) and moving asymptotes algorithm (MMA) methods).

In certain non-limiting embodiments, the first constraint imposes on the second orientation tensor characteristics of a self-dyadic product of a direction vector. For example, the direction vector can be normalized to unity, and the trace of the second orientation tensor can be constrained to be less than or equal to unity. Further, the constraint can be that the off-diagonal elements are substantially constrained (i.e., within 30% of the constraint value) to have a magnitude that is the geometric mean of the corresponding diagonal elements (i.e., $|a_{ij}| \approx \sqrt{a_{jj} a_{ii}}$).

Although the constraint is not directly applied to the mathematical design variables and is not expressly considered when adjusting the mathematical design variables to optimize the objective function, the constraints will indirectly guide the optimization search with the mathematical design variables because the objective function is calculated using the physical design variables. Thus, the constraints are implicit in the value of the objective function because the objective function is calculated using the physical design variables, and the constraints are imposed on the physical design variables through the mappings from the mathematical design variables to the physical design variables. The optimization search performed in the domain of the mathematical design variables is indirectly guided by the constraints because a sensitivity analysis and the optimization search are performed based on the value of the objective function. However, the optimization search performed does not directly account for the constraints, greatly simplifying the numerical process of the optimization search.

For example, in the non-limiting example provided below the mathematical design variables $q_{11}$, $q_{22}$, and $q_{33}$ are each separately constrained with a linear constraint (i.e.,) to have a magnitude of 1 or less (i.e., $|q_{ii}| \leq 1$, such that the vector ($q_{11}$, $q_{22}$, $q_{33}$) lies within a unit cube), but these constraints are easy to implement numerically during the optimization step. However, the constraints related to the tensor invariants $I_1$ and $I_2$, which are imposed on the physical design variables, are nonlinear and therefore would be hard to enforce in the optimization step. Therefore, the constraints are enforced through the transformation/mapping from the mathematical design variables to the physical design variables, rather than being enforced in the design step. In previous methods, such as Free Material Optimization, there was not the separation of functionality between the mathematical design variables and the physical design variables. Rather, in the previous methods, there were only design variables, and these design variables were used/functioned for both the optimization steps and the calculations of the objective function. Thus, in the previous methods, the optimization step were subject to the nonlinear constraints related to the tensor invariants $I_1$ and $I_2$, and these nonlinear constraints in the optimization step made the optimization problem computational intensive. By virtue of separating and dividing the functions of the design variables into mathematical design variables and the physical design variables, the optimization step is simplified by reducing the number of constraints that must be directly accounted for during the optimization step, while the fact that the objective function is calculated using the physical design variables ensures that the optimization is performed consistent with the constraints (i.e., the optimization step is indirectly guided by the nonlinear constraints related to the tensor invariants $I_1$ and $I_2$.

It is to be understood that both the foregoing general description of the invention and the following detailed description are exemplary, but are not restrictive, of the claimed invention.

BRIEF DESCRIPTION OF THE DRAWINGS

A more complete understanding of this disclosure is provided by reference to the following detailed description when considered in connection with the accompanying drawings, wherein.

DETAILED DESCRIPTION

Figure 1A:
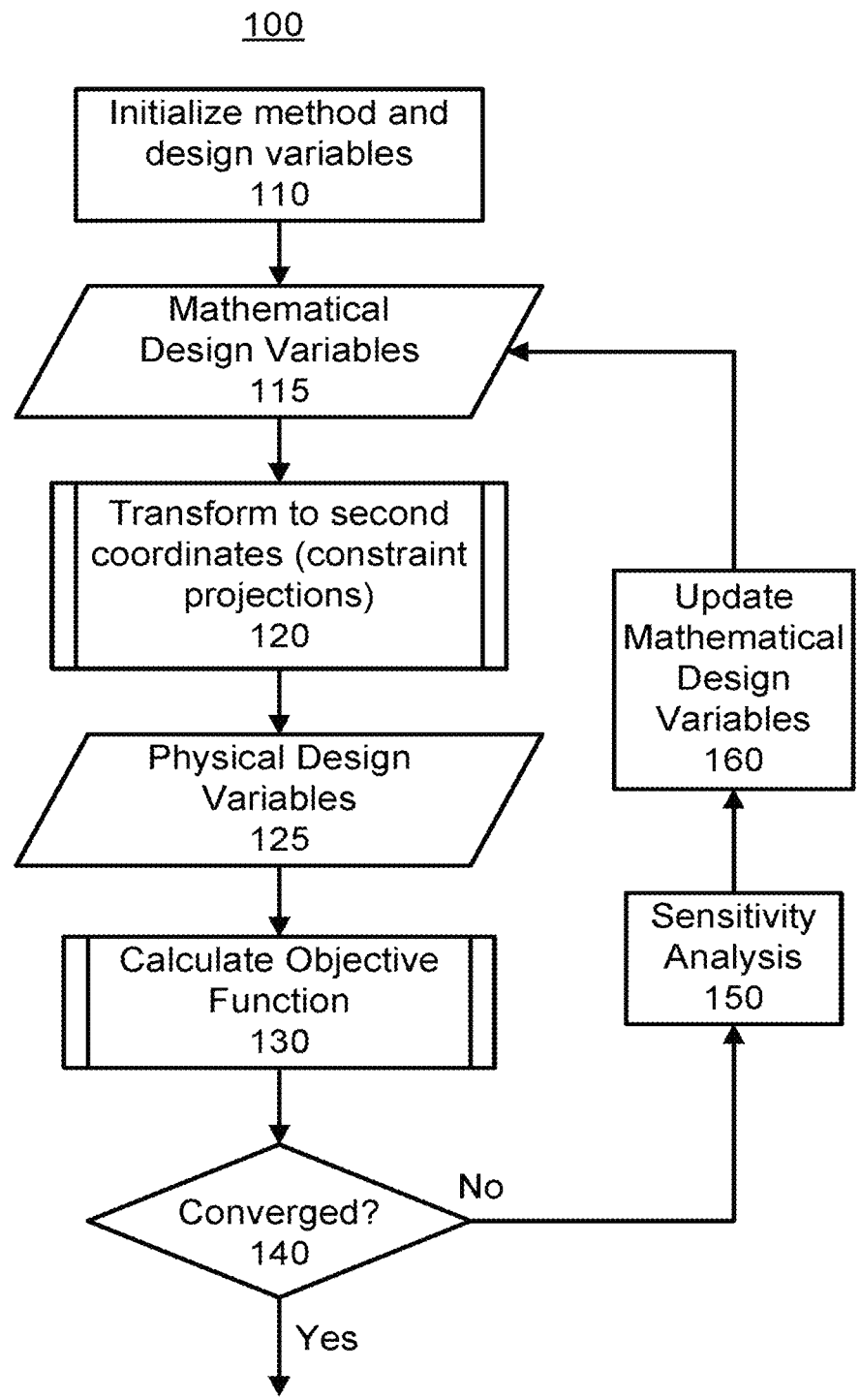
FIG. 1A shows a flow diagram of a method for optimizing an orientation (and topology) of an anisotropic material within a component, according to one implementation.

Advances in materials, such as developments in composite materials like carbon fiber and developments in three-dimensional (3D) printing, offer enticing prospects for developing improved mechanical components in which the material distribution and orientation of anisotropic properties can be optimized to achieve a desired task. For example, the mechanical component can be designed to be stiffer and/or lighter through a proper design of the orientation and topology/distribution of the material making up the component. However, previous methods for Free Material Optimization (FMO) are computational cumbersome because constraints on the design variables are expressed as a large number of non-linear constraints. For example, when the FMO problem is discretized in a Cartesian or other spatial coordinate system (e.g., spherical or cylindrical) the tensor invariants are expressed as a large number of point-wise constraints. Consider that when the FMO problem is implemented numerically, the members of an orientation tensor are freely varying values subject to the constraint that the resulting tensor is positive semi-definite. This involves quadratic constraints at each point in the entire structure. As a consequence, the optimization problem involves an enormous number of nonlinear constraints. As a result of the enormous number of nonlinear constraints, the numerical implementation requires special efforts such as preparation of large scale nonlinear semi-definite programming (SDP) solvers.

In contrast, the methods described herein map the FMO problem to a new coordinate system to remove the non-linear constraints arising from the material-properties. That is the physical design variables satisfy the constraints, but the mathematical design variables that are used in the optimization search update are not subject to the constraints. For example, the methods described herein avoid the above challenges by using a multi-variable projection (e.g., an isoparametric shape function) to map the spatial coordinate into a second coordinate system in which the non-linear constraints are removed. That is, the mapping ensures that the tensor invariants are (substantially) satisfied without requiring express constraints that are imposed as an additional constraint to the optimization problem.

Accordingly, the methods described herein enable topology optimization that are computationally efficient and capable of designing both topology and orientation distribution of anisotropic composite material simultaneously. Topology optimization is a well-established structural optimization framework that optimizes the material distribution (i.e. density, in a given design domain) for maximum performance. Although, previous methods have been successful for designing structures made of isotropic materials, efficient methods for structures made of inhomogeneously distributed anisotropic composite material have been elusive. In contrast to previous methods, the methods described herein extend topology optimization to handle orientation in addition to topology.

For example, the methods described herein use a physical design variable to model orientation based on the idea of the orientation tensor. All tensor components are updated in similar manner to the Free Material Optimization (FMO) technique while maintaining the physical feasibility by using the existing material tensor for interpolation. An advantage of the tensor representation is that the methods described herein are free from complications derived from three-dimensional rotation. Additionally, the method works well with computationally efficient non-linear programming algorithms (e.g., the sequential quadratic programming (SQP) and moving asymptotes algorithm (MMA) methods) because the tensor invariants are kept constant by multi-variable projection without point-wise constraints. The methods described herein can be used with modern topology optimization techniques. Thus, when applied to the stiffness problem used herein to illustrate the method, the method described herein is versatile and flexible enough to solve multi-load problems. As illustrations of the method, single loaded and multiply loaded stiffness maximization problems are provided as non-limiting examples, and numerical results of particular example optimizations are provided to illustrate concurrent density and fiber orientation optimization.

As discussed above, the method described herein provide a topology optimization method for simultaneous optimization of topology and material orientation. The method can be used with topology optimization with density field design variable and gradient based nonlinear programming algorithms. Additionally, an orientation design variable is formulated as a tensor field. This orientation tensor is a unidirectional tensor, i.e. a self-dyadic product of the orientation vector, which is equivalent to a reduced version of the orientation tensor to represent a single direction at a point. By using the tensor based representation, the method is free from a singular point issue, which is usually difficult to avoid with the rotation based approach, and the unique correspondence between each tensor value and material property is naturally assured. Related methods can suffer from the complexity of resolving point-wise multi-variable linear and nonlinear constraints that are used to ensure that the design variables members do not deviate from physically meaningful values (e.g., results that are not positive definite violate physics and are therefore not physical). appropriate tensors. To avoid this complexity, the method described herein uses multi-variable function projections. For example, the orientation tensor is subject to the constraint that the trace of the tensor is unity. This constraint can be represented using a hexahedral shape function to project the physical, spatial coordinate system from a cubic domain into a tetrahedral domain.

The methods described herein are illustrated using the non-limiting example of designing stiff, light-weight components for load bearing applications. In particular, the non-limiting example is illustrated for designing mechanical structure using unidirectional fiber composites. However, the method is not limited by this example. Based on the disclosure herein, a person of ordinary skill can, without undue experimentation, apply the optimization method to other anisotropic design optimizations, including: electromagnetic, heat transfer, thermal-structural, and magnetic-thermal-fluid problems. Accordingly, the methods described herein are not limited to the illustrative, structural mechanics examples discussed below. Rather, concrete examples are used to improve clarity, not by way of limitation. In general, the method can be applied to any optimization problem in which the orientation as a function of position for an anisotropic material is adjusted to optimize an aspect of a component that is represented by an objective function. This optimization can be either a two-dimensional optimization or a three dimensional optimization. And the optimization can be performed using a non-linear programming solvers, such as MMA, SQP, a gradient-based method, a genetic algorithm, a simulated annealing algorithm, etc.

Referring now to the drawings, wherein like reference numerals designate identical or corresponding parts throughout the several views, FIG. 1A shows a flow diagram of a method 100 for optimizing the orientation (and in some implementations the distribution) in a component. Herein, the illustrative example of designing a mechanical structure made of a uniaxial material (a fiber composite) is provided.

In step 110, various values used in the optimization are initialized. For a component that is to be designed, the initialized values can include the distribution of material in the component and the orientation of the anisotropic property of the material. Herein a non-limiting, structural-mechanics example of optimizing the stiffness of a load-bearing component is used to illustrate the component-design method 100. The output from step 110 can include mathematical design variables 115.

In the structural-mechanics example, the mathematical design variables 115 can include an orientation tensor with elements $q_{ij}$.

In step 120, to simplify the optimization problem, the mathematical design variables are mapped to physical design variables. In contrast to the methods described herein, related methods for free material optimization (FMO) use a single set of design variables for both the optimization step and the physics simulation step, whereas the methods described herein use mathematical design variables 115 for the optimization step (i.e., step 160 of method 100) and physical design variables 125 for the physics simulation step (i.e., step 130 of method 100). Like the physical design variables 125, the single set of design variables are subject to constraints corresponding to tensor invariants (e.g., the tensor invariants $I_1$, $I_2$, and $I_3$ discussed below). These constraints arise from the physical meaning of the design variables. For example, when the design variables represent an orientation tensor, which is a self-dyadic product of a unit direction vector, the trace of an orientation tensor is the $l_2$-norm of the unit direction vector (i.e., the Euclidean length), which is by definition unity because the direction vector is a unit direction vector. The orientation tensor has physical significance because the anisotropic tensor (e.g., an elasticity tensor $C_s$) for the anisotropic material is calculated based on the orientation tensor. For example, a fiber composite material is uniaxial, meaning it exhibits a unique elasticity value one direction and is isotropic in the other two dimensions. When, in the related methods, the same design variables are used in the mathematical optimization step, in addition to the physical simulation step, then the mathematical optimization step is subject to the physical constraints arising from the physical meaning of the design variables.

In contrast, the methods described herein remove the constraints from the optimization step by using different design variables for the mathematical optimization and physical simulation steps. Even though the mathematical optimization is not expressly subject to the constraints, the constraints are nevertheless enforced for the and physical simulation step because the mapping from the mathematical design variables 115 to the physical design variables 125 ensures that the constraints are substantially satisfied.

Herein, the phrase "substantially satisfied" when applied to the constraints means that the constraint is satisfied to within a predefined threshold (e.g., the value of the tensor invariant $I_2$ is within 30% of the desired value). Often the optimization provides meaningful results even when one or more of the constraints are only substantially satisfied rather than exactly satisfied. This relaxation with regards to enforcing the constraints can improve performance of method 100 by making the mapping in step 120 numerically more well behaved (e.g., making the mapping differentiable).

Accordingly, the mapping in step 120 allows the mathematical design variables 115 to be updated/adjusted in step 160 without expressly considering the constraints while ensuring that the physical design variables 125 substantially satisfy various constraints, which are dictated tensor invariants. Thus, the optimization can be performed without expressly imposing the constraints during the optimization step, thereby eliminating the computational complexity that would be incurred by accounting for the constraints in the optimization step.

In step 130, the value for the objective function is calculated using the physical design variables 125.

In step 140, an inquiry is performed to determine whether the component configuration has sufficiently converged to the optimal configuration. Convergence can be determined based on some predetermined convergence criteria. When the convergence criteria are not satisfied, method 100 repeats the optimization loop by proceeding from step 140 to step 150.

In step 150, a sensitivity analysis is performed to estimate a next step in the optimization search. For example, the sensitivity analysis can include estimating a gradient (and in some implementations a second derivative) of the objective function within the search space. That is, the objective function is most sensitive to changes in direction for which the magnitude of the gradient is maximized.

In step 160, the mathematical design variables 115 are updated based on the sensitivity analysis performed in step 150. For example, using the estimated gradient from step 150, a size and direction for an update step can be determined for the next iteration of the optimization search.

Now a more detailed description of the steps of method 100 is provided, according to an illustrative, non-limiting implementation. In general, many variations of method 100 are possible, and these many variations are within the contemplated optimization method discussed herein. There are variations in the order in which the steps illustrated in FIG. 1A can be performed without deviating from the spirit of the optimization method. Further, there are variations in which the individual steps illustrated in FIG. 1A can be performed without deviating from the spirit of the optimization method. The non-limiting implementation described herein is provided to illustrate the method, and does not limit the optimization method to a particular order of steps. Nor does the non-limiting implementation described herein limit the optimization method to the illustrative manner in which the steps are disclosed herein. For example, in step 160 a gradient descent method can be used to illustrate updating the mathematical design variables 115, but this illustrative example does not preclude alternatives such as simulated annealing or genetic algorithms or a combination thereof being used to optimize the mathematical design variables 115. Further, method 100 is illustrated using the non-limiting example of optimizing structural mechanics, but method 100 is applicable to other anisotropic material optimization problems. Although method 100 is illustrated using the example of optimizing the stiffness of a component, this non-limiting, illustrative example does not preclude method 100 from other applications in which, e.g., piezo electric or magnetic property of the component is optimized rather than the elasticity.

In step 110, various values used in the optimization are initialized. For example, an initial guess of the optimal component configuration is set (i.e., the topology/distribution of the material and the orientation of the material in the mechanical structure). The optimal component configuration is based on a set of optimization criteria (e.g., minimizing the compliance of a component), which are expressed via an objective function to be optimized. In certain implementations, the starting point (i.e., the initial guess) for an optimization search can be important for determining the rate of convergence and for determining whether the search converges to a global minimum rather than a local minimum. Further, some optimization methods, including gradient-based methods, use values from previous iterations to perform a sensitivity analysis, which informs method 100 regarding the best direction and size for the next step in the search. Each iteration of the loop (i.e., step in the iterative search path) provides a new guess as to the optimal configuration, and the feedback provided by calculations of the objective function for respective steps along the search path (i.e., previous guesses as to the optimal configuration) enables current iteration of the optimization to better refine the current guess and eventually converge to the optimal configuration. Herein, the "configuration" of the component being optimized refers to the orientation (and in some implementations the distribution/topology) of the anisotropic material making up the component.

For example, in gradient descent methods, the next guess is based on a local estimate of the gradient. In certain implementations, an adjoint variable/state method can be used to estimate the sensitivity/gradient of the objective function to changes in the mathematical design variables. The search space for the optimization search is the realm of possible configurations of the component (e.g., the configuration is the topology/distribution and the orientation of the material in the mechanical structure).

As discussed above, there is a benefit to having separate mathematical design variables 115 and physical design variables 125. In process 120, the mathematical design variables 115 are mapped to the physical design variables 125. In this way, the mathematical design variables 115 can be optimized without expressly accounting for constraints corresponding to the tensor invariants of the physical system. Rather, these constraints are enforced by projections/mappings onto the physical design variables 125. The physical design variables 125 are then used in step 130 to perform a physical simulation of the component and calculate a value of the objective function for a current configuration of the component.

Thus, even though constraints corresponding to the tensor invariants are not expressly imposed on the mathematical design variables 115, the optimization is implicitly guided by these constraints.

Accordingly, due to the combination of the mapping in step 120 and the sensitivity analysis in step 150, the optimization routine is guided to update the mathematical design variables 115 along directions consistent with the tensor invariants because those directions are the most sensitive. Thus, the optimization is implicitly guided by the tensor invariants through the sensitivity analysis, even though the mathematical design variables 115 are not expressly constrained by the tensor invariants. The tensor-invariant constraints indirectly guide the optimization search because the objective function is calculated using the physical design variables. Thus, the constraints are implicit in the value of the objective function because the objective function is calculated using the physical design variables, and the constraints are imposed on the physical design variables through the mappings from the mathematical design variables to the physical design variables. The optimization search performed in the domain of the mathematical design variables is indirectly guided by the constraints because a sensitivity analysis and the optimization search are performed based on the value of the objective function. However, the optimization search performed does not directly account for the constraints, greatly simplifying the numerical process of the optimization search.

Accordingly, due to the combination of the mapping in step 120 and the sensitivity analysis in step 150, the optimization routine is guided to update the mathematical design variables 115 along directions consistent with the tensor invariants. Thus, the optimization is implicitly guided by the tensor invariants through the sensitivity analysis, even though the mathematical design variables 115 are not expressly constrained by the tensor invariants.

The absence of express constraints for the tensor invariants in step 160 greatly simplifies the numerical/computational implementation and complexity, resulting in reduced computational complexity and time.

In contrast to the methods described herein, related methods for free material optimization (FMO) typically use a single set of design variables for both the mathematical optimization step (e.g., step 160) and physical simulation step (e.g., process 130), rather than using two distinct sets of design variables as illustrated in FIG. 1a (i.e., the mathematical design variables 115 for the mathematical optimization step and the physical design variables 125 for the physical simulation step). When a single set of design variables is used in both process 130 and in step 160, a large number of non-linear constraints must be used in step 160 to enforce the tensor invariants. Numerically implementing this large number of non-linear constraints introduces significant computationally complexity.

Figure 1B:
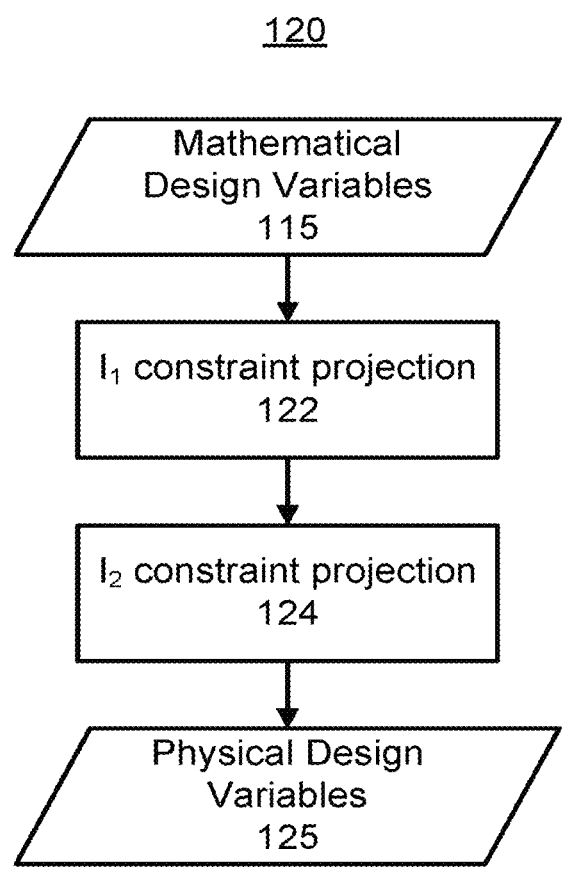
FIG. 1B shows a flow diagram of a process to map mathematical design variables to physical design variables, according to one implementation.

FIG. 1B shows a flow diagram of a non-limiting example of the mapping from the mathematical design variables 115 to the physical design variables 125. In this example, the mapping includes two steps.

Figure 2A:
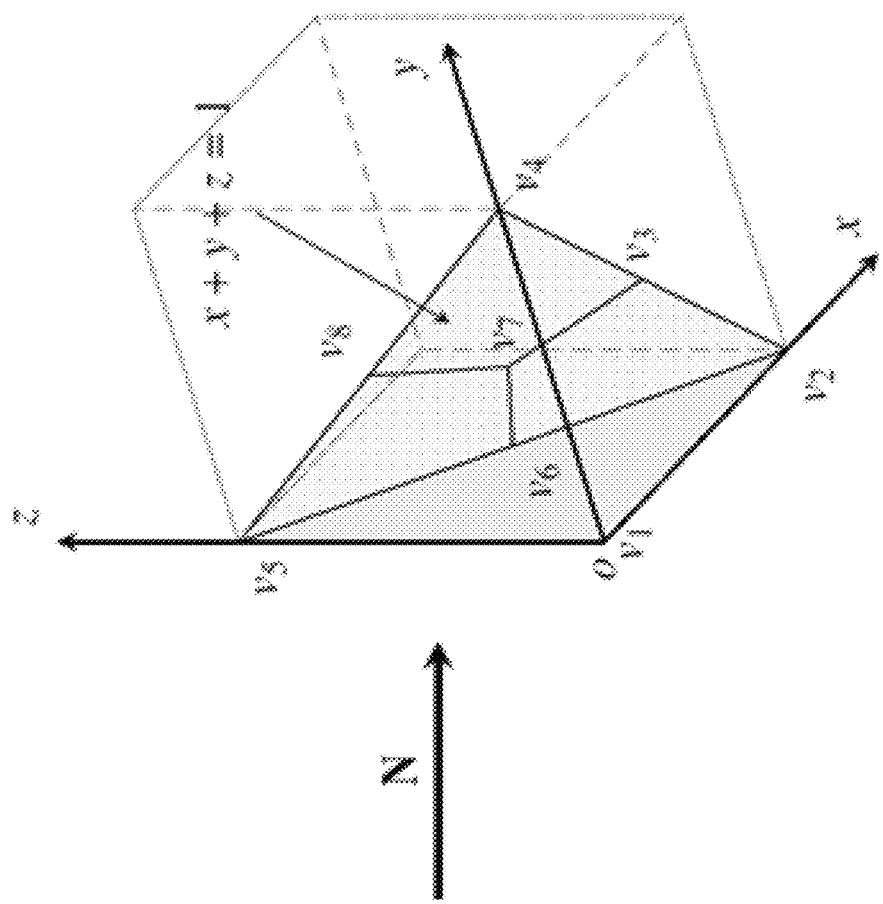
FIG. 2A shows a first constraint projection operation, according to one implementation.
Figure 2A:
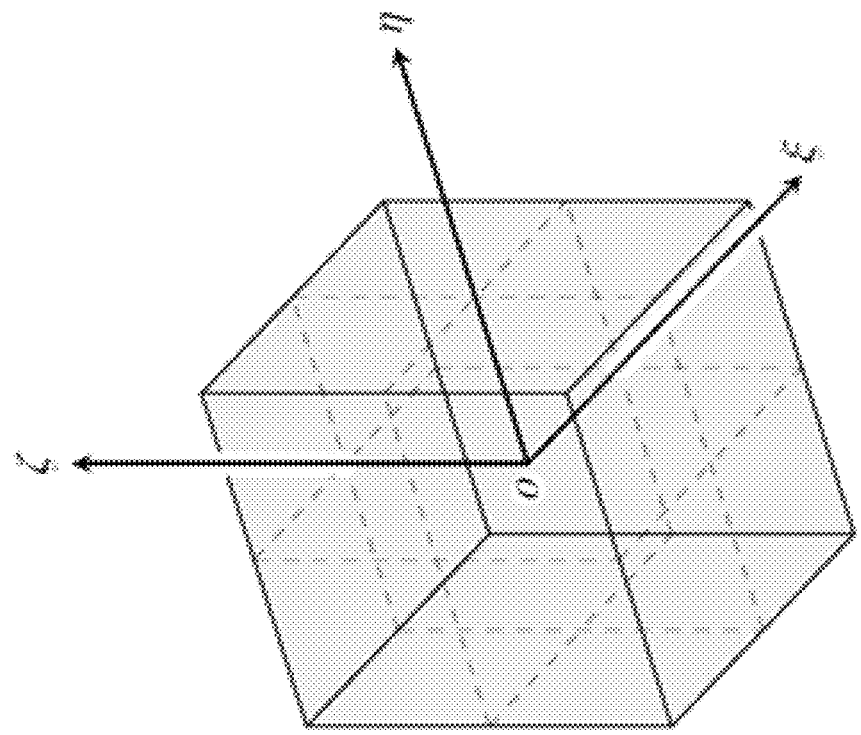

In step 122, a first projection is performed to enforce a first tensor invariant, which is referred to as $I_1$. For example, the first projection can be performed via a coordinate transformation from a first set of coordinates to a second set of coordinates. In the non-limiting example discussed below, this coordinate transformation is performed using a hexahedral shape function to map the first coordinates $\xi$, $\eta$, and $\zeta$ to the second coordinates x, y, and z. FIG. 2A illustrates the first projection.

Figure 2B:
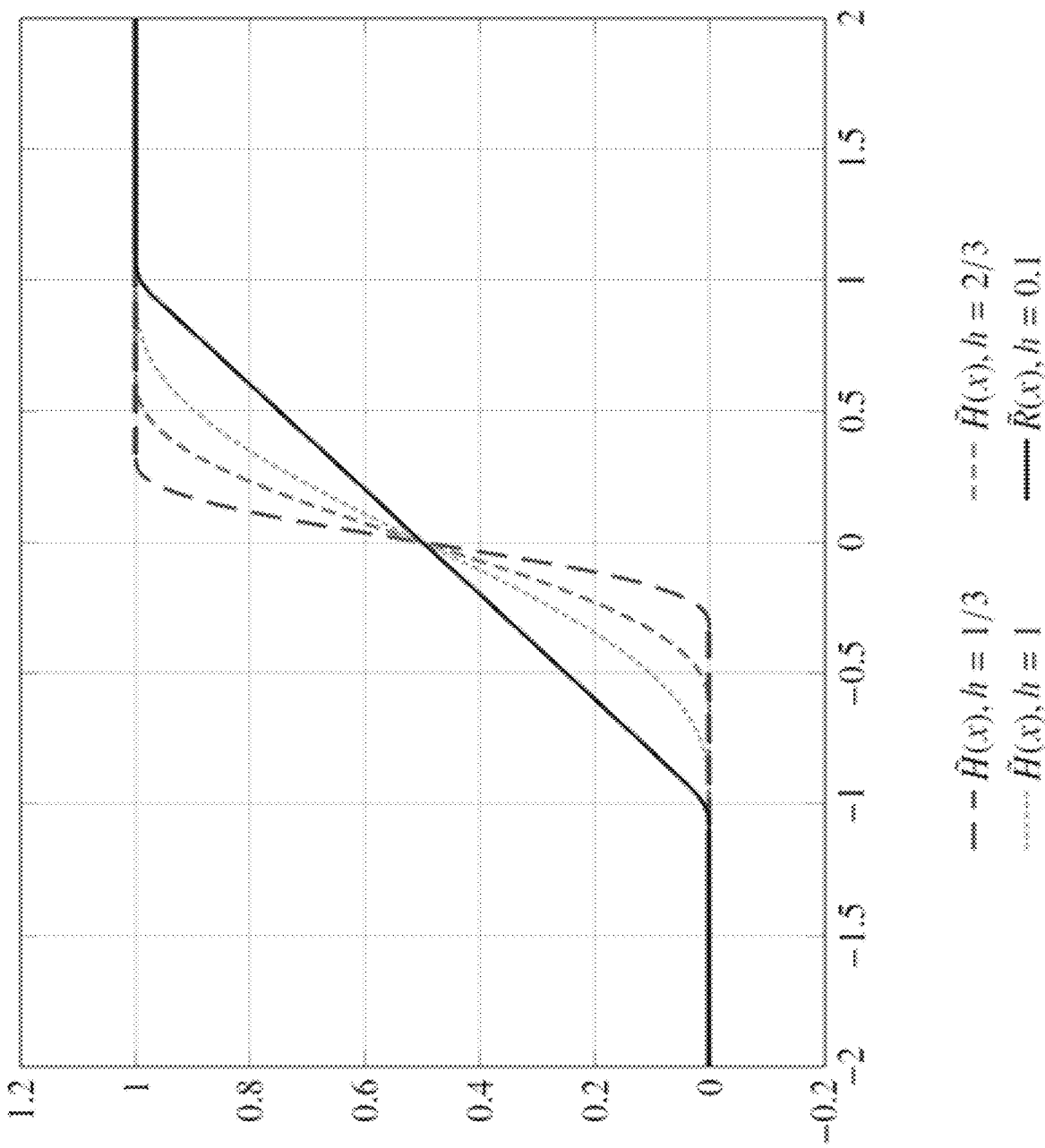
FIG. 2B shows a second constraint projection operation, according to one implementation.

In step 122, a second projection is performed to enforce a second tensor invariant, which is referred to as $I_2$. For example, the second projection can be performed used a modified ramp function $\tilde{R}(\cdot)$ via equation $$a_{ij} = \sqrt{a_{ii}a_{jj}}(2\tilde{R}(\tilde{q}_{ij})-1),$$

wherein $q_{ij}$ are the mathematical design variables 115, $a_{ij}$ are the physical design variables 125, and additional details are provided below. FIG. 2B illustrates the second projection.

Figure 1C:
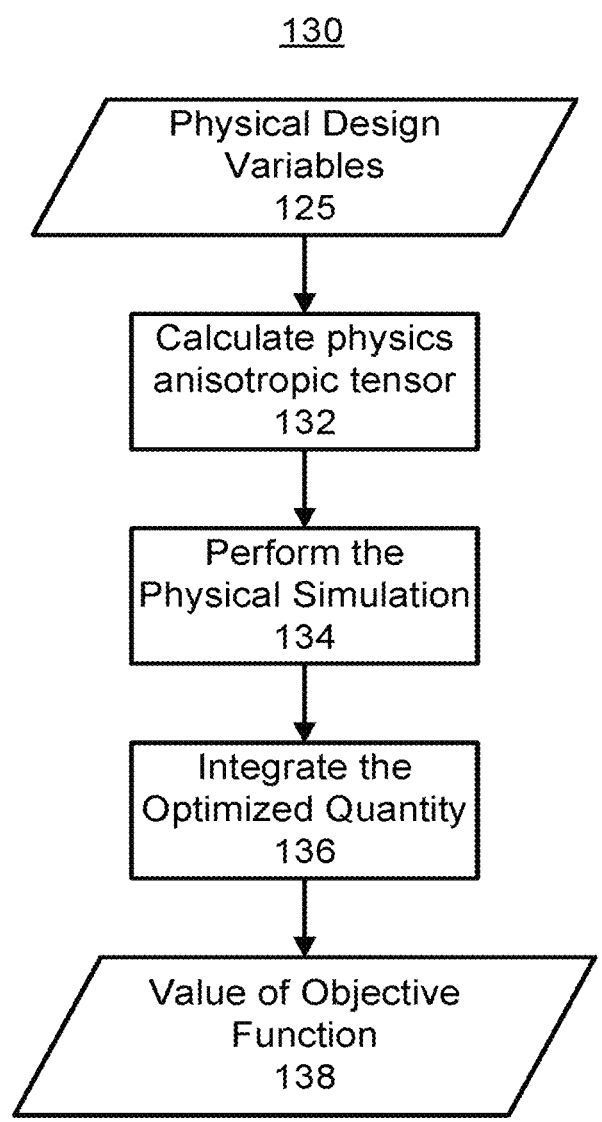
FIG. 1C shows a flow diagram of a process for calculating a value of an objective function, according to one implementation.

In process 130 of method 100, the value of the objective function is calculated using the physical design variables 125. FIG. 1C shows a flow diagram of a non-limiting example of calculating the objective function.

In step 132, the orientation of the anisotropic material property as a function of position is determined from the physical design variables 125. For example, an orientation tensor $a_2$ can be used to define a solid elastic tensor, $C_s$, as discussed below.

In step 134, a physical simulation is performed using the spatially-varying orientation of the anisotropic material property determined in step 132. This is illustrated herein using a non-limiting example from structural mechanics in which the compliance/stiffness of the component is optimized. For this optimization problem, the physical simulation can be performed using a finite element analysis (FEA) based on the solid elastic tensor $C_s$ that was calculated in step 132.

In step 136, the results of the physical simulation in step 134 are used to calculate the objective function. For example, the compliance values of across the grid points of an FEA mesh can be integrated to determine the compliance/stiffness of a load-bearing component. The objective-function value 138 is the result of this calculation.

Returning to FIG. 1A, a sensitivity analysis can be performed in step 150. For example, this can include estimating a gradient (and in some implementations a second derivative) for the objective function as a function of the search space (i.e., the space of all possible configurations of the component, wherein the configurations include material orientation and/or distribution/topology). The sensitivity analysis (e.g., gradient) is based on the objective-function values 138 calculated for the component configurations of the current iteration.

In step 160, the results of the sensitivity analysis are used to update the mathematical design variables 115. That is, step 160 determines the next step along the trajectory of the iterative optimization search. For example, an optimal step size along a gradient can be used to move towards an extrapolated minimum, and smaller step sizes might be used to minimize the risk of overshooting the minimum. Various search methods can be used depending on the particular optimization problem and tradeoffs between convergence rate, stability, robustness, etc.

In step 140 of method 100, a query is performed to determine whether the search has converged to an optimal configuration. This query can return a negative result when one or more convergence criteria are not satisfied. For example, the convergence criteria can include a maximum number of iterations, and/or whether a difference between respective iterations decreases below a predefined threshold. In an example discussed below, convergence is queried only once every ten iterations, and then the current value for the objective function is compared to the objective function ten iterations previous to determine convergence.

When the component configuration is determined to have converged to an optimal configuration, method 100 is complete. Otherwise, the loop including steps 150, 160, 120 and 130 are repeated until the convergence criteria are not satisfied.

The implementation in FIG. 1A can be used to optimize various design variables. Herein, these design variables at least include an orientation of an anisotropic material of the component to be optimized. Additionally, the design variables can include a spatial distribution/topology of the material within the component. These two different types of design variables (i.e., orientation and distribution) can either be optimized concurrently or sequentially.

The extension of method 100 to concurrent optimization of two or more different types of design variables is straightforward. The mathematical design variables 115 and the physical design variables 125 can include all of the different types of design variables, even though the transformation in step 120 might only affect a subset of the design variables (e.g., the orientation).

The extension of method 100 to sequential optimization of two or more different types of design variables is also straightforward. For example, method 100 can be extended to include an inner loop directed to optimizing a first type of design variables and include an outer loop directed to optimizing a second type of design variables. Alternatively, method 100 can be extended toggling between optimizing a first type of design variables and a second type of design variables. For example, the loop of steps 120-160 of method 100 can iteratively repeat to optimize the orientation until the incremental change between iterations falls below a predefined threshold. Then, the loop of steps 120-160 of method 100 can toggle to iteratively repeating to optimize the distribution until the incremental change between iterations falls below another predefined threshold, when it toggles back to optimizing the orientation, and so forth until the overall configuration (e.g., the combination of orientation and distribution) sufficiently converges to the optimal configuration.

The advantages of the methods described herein can be better understood in light of how they provide improvements over related methods. As discussed above, in order to realize the improvements offered by anisotropic composites for structural parts, the stress orientation and material orientation should be aligned appropriately at each point in the structure. This can be achieved using a structure made of a fiber composite in which the fiber axis varies spatially point-to-point in the structure, i.e., a Variable Axial Composite (VAC).

The fabrication of parts using a VAC can be achieved by controlling spatially varying material orientation with robotic based mechanisms such as Automated Fiber Placement (AFP), Tailored Fiber Placement (TFP), or continuous Fiber Printing (CFP). In general, these technologies deposit a continuous fiber bundle onto the surface (e.g., a plane or a curved surface) with orientation control in a tangent space. Thus, some of these technologies are capable of providing partial three-dimensional orientation control directly or indirectly in combination with three-dimensional sheet forming. Therefore, given an appropriate design, fabrication of a three-dimensional orientation controlled VAC structure is feasible using the above-noted fabrication techniques. The methods described herein provide a computationally efficient approach to generate optimal VAC structure designs. However, the related methods described below each fall short in one or more aspects.

In a first related method, Free Material Optimization (FMO) is performed using the distribution of each term of the elastic tensor as a design variable, offering maximum flexibility of the representation of structure and material distribution at the same time. Theoretically, this method is capable of deriving the optimal material configuration due to the advantage of directly manipulating of the tensor itself. On the one hand, this method advantageously circumvents the concept of rotation and the complexity that stems from it such as angle handling in three-dimensional space. On the other hand, this method suffers from two main challenges.

The first challenge is engineering applicability. Typically, structural optimization for light weighting uses structure weight for cost evaluation, whereas, in FMO, cost evaluation is typically based on the first tensor invariant, which is difficult to interpret with engineering measures. Further, in FMO, by allowing a maximum degree of freedom in material representation, it is difficult to realize such material property with current fabrication methods.

The second challenge relates to numerical implementation. To make a set of freely varying values as members of a material property tensor, the resulting tensor should be positive semi-definite. This involves quadratic constraints at each point in entire structure, and, as a consequence, the optimization problem involves an enormous number of nonlinear constraints. Ordinary nonlinear programming methods are not able to cope with such a large number of nonlinear constraints. Thus, the numerical implementation of the first related method requires special efforts such as preparation of large scale nonlinear semi-definite programming (SDP) solvers.

In a second related method, Discrete Material Optimization (DMO) offers improved engineering applicability compared to the first related method. DMO is performed by converting the orientation distribution problem to a material selection problem to provide a practical engineering solution. DMO prepares a discrete set of possible orientation angles, provides corresponding material options, and solves multi-material layout problems. This idea is practical for designing large scale composite structures, where the size of the structure to be designed is much larger than the size of composite material panel unit. However, the second related method sacrifices the degree of freedom in orientation representation, making it unsuitable for VAC design.

In contrast to these two related methods, the methods described herein provide a computationally efficient approach to design a structure with an arbitrary shape and topology with spatially varying continuous orientation distribution without the computational complexity of the large number of non-linear constraints presented by the first related method.

In some aspects, the methods described herein can be understood as extensions of the unit-direction-vector-field approach described in U.S. Pat. No. 9,576,088 and in T. Nomura et al., "General topology optimization method with continuous and discrete orientation design using isoparametric projection," International Journal for Numerical Methods in Engineering vol. 101, p. 571 (2015), both of which are incorporated herein by reference in their entirety.

The methods described herein can be applied to a generic topology optimization formalism, and are therefore applicable to a wide range of engineering situations including functionally graded structure problems and anisotropic panel combination problems.

Similar to FMO, the methods described herein have quadratic constraints at each point to keep the direction vector a unit vector. However, unlike FMO, the methods described herein enforce these mass nonlinear constraints using a projection based approach in which a vector function (e.g., an isoparametric shape function) removes nonlinear constraints. As a consequence, the optimization problem can be solved with common non-linear programming solvers, such as MMA and SQP.

Further, the methods described herein are extensions of the above-noted unit-direction-vector-field approach, and are capable of solving three-dimensional problems. Instead of using a direction vector, the methods described herein use a tensor representation, which is introduced by incorporating the ideas of FMO together with an orientation tensor, while avoiding the previously mentioned two challenges of FMO. The tensor representation provides significant advantages in orientation design. Compared to the two-dimensional case, mathematical handling of rotation in three-dimensional space can give rise to complications. However, the tensor representation naturally resolves these complications.

The two challenges in FMO are naturally resolved by the unit-direction-vector-field approach. With regards to engineering applicability, by virtue of using separate density design variables, weight can be optimized naturally within this framework. Further, the material interpolation is generated based on a material tensor. Thus, if the material tensor is based on feasible material properties, the material interpolation will also be feasible. For example, the material tensor can be a measured tensor or one derived with a micromechanics model or a homogenization method.

With regards to numerical implementation, the methods described herein also represent an improvement over the unit-direction-vector-field approach. Here, the methods extend vector function projection based nonlinear constraint handling to the tensor representation, and thus, a standard nonlinear math programming solver can be used to solve of the optimization problem.

Various implementations of the above-noted improvements are discussed in more detail below.

In certain implementations, the methods described herein use density- and gradient-based topology optimization with Helmholtz filtering and Heaviside projection. Additionally, the orientation design variable can be formulated using a tensor field. For example, in one non-limiting example considered here, the orientation is a locally varying axial distribution. That is, only one specified axial direction has a different material property and material properties in all other directions perpendicular to this axis are assumed to be isotropic (i.e., a transversely isotropic material). Therefore, only orientation of the primary axis itself is significant and rotation around this axis can be ignored. The orientation design variable is defined using an orientation tensor, which is capable of representing the distribution of orientations at respective points.

In certain implementations, a fixed design domain, D, is assumed, and, inside of D, the following characteristic function is defined to indicate object domain to be designed, $\Omega_d$;

$$\chi(x) = \begin{cases} 0 & \text{for } \forall x \in D \setminus \Omega_d, \\ 1 & \text{for } \forall x \in \Omega_d. \end{cases}$$

Here, $\chi(x)$ is defined by an implicit function, $\phi$, and the Heaviside function such that $$\chi(x) = H(\phi(x)) = \begin{cases} 0 & \text{for } \forall x \in D \setminus \Omega_d, \\ 1 & \text{for } \forall x \in \Omega_d. \end{cases}$$

For the regularization of the function space, certain implementations can use a Helmholtz filter:

$$-r_\phi^2 \nabla^2 \tilde{\phi} + \tilde{\phi} = \phi \quad \text{Eq. (1a)}$$

wherein $r_\phi$ is the filter radius and $\tilde{\phi}$ is a filtered field. The regularized Heaviside function is introduced to relax $\chi(x)$ to the material density field $\rho(x)$ $$\rho(\tilde{\phi}) = \tilde{H}(\tilde{\phi}),$$

wherein $\tilde{H}(\tilde{\phi})$ is a regularized Heaviside function such that $$\tilde{H}(\tilde{\phi}) = \begin{cases} 0 & (\leq \tilde{\phi} < -h) \\ \frac{1}{2} + \frac{15}{16}\left(\frac{\tilde{\phi}}{h}\right) - \frac{5}{8}\left(\frac{\tilde{\phi}}{h}\right)^3 + \frac{3}{16}\left(\frac{\tilde{\phi}}{h}\right)^5 & (-h \leq \tilde{\phi} < -h), \\ 1 & (h < \tilde{\phi}\ ) \end{cases}$$

wherein h is a parameter to control the transition bandwidth between 0 and 1.

The constitutive tensor, e.g. the elastic tensor for a structural problem, is interpolated between a void and a solid state using $\rho$ $$C_\rho = C_v + \rho^p(C_s - C_v), \quad \text{Eq. (2a)}$$

wherein $C_\rho$, $C_v$, $C_s$ are the interpolated tensor, void tensor, and solid tensor, respectively, and p is the density penalty parameter. In the following discussion, $C_s$ is extended to be anisotropic, where orientation is controlled with orientation design variables.

Orientation of the material is modeled using the orientation tensor. The benefit of using the orientation tensor compared to other three-dimensional angle representations stems from the absence of the concept of rotation, which in practice can lead to various problems. For instance, the Euler angle representation has a fundamental disadvantage with a singular-point problem, or a DOF reduction problem (e.g., gimbal locking). The quaternion may resolve the singular-point problem; however, using the quaternion is equivalent to using a direction vector in the case of the axis orientation problem, and the π-ambiguity still remains. That is, the same material property can be represented by two values indicating directions opposite to each other, inducing a spurious gap in the design variable distribution if these values appear at proximity to indicate the same material property, which is likely to happen if the orientation field features an annular arrangement. These challenges can be avoided by limiting the orientation representation capability to a semi-sphere domain. However, limiting the orientation representation to a semi-sphere domain can induce a severe side effect in finding optimal values near the symmetry plane of the sphere as a result of restricting design values from moving across the cut plane without introducing a special rule, which may cause another side effect by violating the basic assumption in most of the real number gradient based math programming methods that all the real valued variables are continuous.

On the other hand, representing material orientation using the orientation tensor avoids rotation. The tensor is directly used for material property interpolation with a unique correspondence between a tensor value and the resulting material property, and accordingly all the aforementioned problems are circumvented by this approach.

The orientation tensor describes the orientation distribution at a point using a self-dyadic of the unit direction vector for a single orientation, and the orientation tensor takes weighted integration for all angles using probability for each direction as a weighting function. Since each point is assumed to have a single orientation in this problem, i.e. unidirectional orientation, a single self-dyadic tensor is sufficient to represent the material orientation.

A unit direction vector, p, is written as follows;

$$p = p_i = \begin{bmatrix} p_1 \\ p_2 \\ p_3 \end{bmatrix}$$

wherein $-1 \leq p_i \leq 1$ and p. Based on this, the unidirectional tensor of order 2, $a_2$, can be simply defined as a self-dyadic product of p as follows;

$$a_2 = a_{ij} = \begin{bmatrix} a_{11} & a_{12} & a_{13} \\ a_{21} & a_{22} & a_{23} \\ a_{31} & a_{32} & a_{33} \end{bmatrix}$$

$$a_2 = p \otimes p$$

$$a_2 = p_i p_j$$

$$a_2 = \begin{bmatrix} p_1 p_1 & p_1 p_2 & p_1 p_3 \\ p_1 p_2 & p_2 p_2 & p_2 p_3 \\ p_2 p_3 & p_1 p_3 & p_3 p_3 \end{bmatrix}$$

wherein $\otimes$ is dyadic/tensor product operator. Clearly, $a_2$ is symmetric and $\delta_{ij} - 1 \leq a_{ij} \leq 1$ where $\delta_{ij}$ is Kronecker delta, and hence, the diagonal elements, $a_{ii}$, are always positive.

Similarly, unidirectional tensor of order 4 can be defined either with the directional vector or the orientation tensor of order 2 as follows;

$$a_4 = a_2 \otimes a_2 = a_{ijkl} a_{ij} a_{kl}$$

$$a_4 = p \otimes p \otimes p \otimes p = p_i p_j p_k p_l.$$

The unidirectional tensor of order 2 is sufficient to describe unidirectional orientation at a point because the unidirectional tensor of order 4 can be derived from the tensor of order 2.

Similar to the topology representation, a mathematical design variable is defined on the $L^\infty$ function space. Since the unidirectional tensor is symmetric, only the upper triangle elements are used as the design variables, and they are projected on to the $H^1$ function space by Helmholtz filtering.

Here, the orientation design variable $q_2$ are defined as;

$$q_2 = q_{ij} = \begin{bmatrix} q_{11} & q_{12} & q_{13} \\ & q_{22} & q_{23} \\ sym. & & q_{33} \end{bmatrix},$$

wherein $q_{ij}$ are independent design variables with range $\delta_{ij} - 1 \leq q_{ij} \leq 1$ for $(i,j) = \{(1,1),(1,2),(1,3),(2,2),(2,3),(3,3)\}$, and the Helmholtz filtering is applied for each as;

$$-r_q^2 \nabla^2 \tilde{q}_{ij} + \tilde{q}_{ij} = q_{ij}. \quad \text{Eq. (1b)}$$

wherein $r_q$ is filter radius for orientation design. Then, the filtered orientation design variables $\tilde{q}_{ij}$ are projected on to a unidirectional tensor with the following functions;

$$a_2 = a_{ij}(\tilde{q}_{ij}) = \begin{cases} \tilde{R}(2\tilde{q}_{ij} - 1): & i = j \text{(diagonal elements)} \\ 2\tilde{R}(\tilde{q}_{ij}) - 1: & i \neq j \text{(off diagonal elements)}, \end{cases}$$

is a differentiable version of a ramp function with a slope from (−1,0) to (1,1) with a cut-off at 1, and hence, $\delta_{ij}-1 \leq a_{ij} \leq 1$ is maintained. Then, the unidirectional tensor of order 4, $a_4$, is obtained by substituting the above equation for $a_2$ into the equation $a_4=a_2 \otimes a_2$.

The mathematical design variables 115 includes the orientation design variable $q_2$. And the physical design variables 125 includes the orientation tensor $a_2$. The mapping between from the orientation design variable $q_2$ to the orientation tensor $a_2$ is discussed below after introducing the tensor invariants that the mapping is meant to (substantially) enforce.

Here, the solid elastic tensor, $C_s$ is expanded to a transverse isotropic tensor whose normal axis is the principal axis of the unidirectional tensors, $a_2$ and $a_4$. By considering symmetry of the elastic tensor (i.e., $C_{ijkl}=C_{jikl}=C_{ijlk}=C_{klij}$), $C_s$ can be interpolated with both $a_4$ and $a_2$ as follows;

$$C_s(a_4,a_2)=B_1 a_{ijkl}+B_2(a_{ij}\delta_{kl}+a_{kl}\delta_{ij})+B_3(a_{ik}\delta_{jl}+a_{il}\delta_{jk}+a_{jk}\delta_{il}+a_{jl}\delta_{ik})+\ldots B_4(\delta_{ij}\delta_{kl})+B_5(\delta_{ik}\delta_{jl}+\delta_{il}\delta_{jk}).$$  Eq. (2b)

The coefficients $B_1, B_2, \ldots, B_5$ are defined by $B_1=C_{1111}+C_{2222}-2C_{1122}-4C_{1212}$ $B_2=C_{1122}-C_{2233}$ $B_3=C_{1212}+(C_{2233}-C_{2222})/2$ $B_4 C_{2233}$ $B_5=(C_{2222}-C_{2233})/2,$ wherein $C_{ijkl}$ is an element of a given transverse isotropic (unidirectional) elastic tensor $C_u$ with normal axis in the x-direction, i.e.;

$$C_u = \begin{bmatrix} C_{1111} & C_{1122} & C_{1122} & 0 & 0 & 0 \\ & C_{2222} & C_{2233} & 0 & 0 & 0 \\ & & C_{2222} & 0 & 0 & 0 \\ & & & C_{2323} & 0 & 0 \\ & sym. & & & C_{1212} & 0 \\ & & & & & C_{1212} \end{bmatrix}.$$

In order to make a set of values to be components of a tensor, some conditions have to be satisfied. The tensor invariants are used to define these conditions in this formulation which constrain all six independent values in order 2 of the projected orientation tensor $a_{ij}$.

The first constraint is to satisfy the first tensor invariant $I_1$. Since, unidirectional tensor $a_{ij}$ is a self-dyadic product of the unit direction vector, the value should be always unity. Therefore, the constraint can be written as;

$I_1=tr(a_2)=a_{11}+a_{22}+a_{33}=1.$

This equality condition is relaxed, and the inequality condition is as follows;

$a_{11}+a_{22}+a_{33} \leq 1.$

Therefore the constraint is defined as $g_{I1}=a_{11}+a_{22}+a_{33}-1 \leq 0.$

The second constraint is on the second tensor invariant $I_2$.

$$I_2 = \begin{vmatrix} a_{22} & a_{32} \\ a_{23} & a_{33} \end{vmatrix} + \begin{vmatrix} a_{11} & a_{21} \\ a_{12} & a_{22} \end{vmatrix} + \begin{vmatrix} a_{11} & a_{31} \\ a_{13} & a_{33} \end{vmatrix},$$

Wherein, on the right hand side, the operator $\|\cdot\|$ is a determinant. The value of $I_2$ always equals zero. Also, in view of the identity $$\begin{bmatrix} a_{11} & a_{12} & a_{13} \\ a_{21} & a_{22} & a_{23} \\ a_{31} & a_{32} & a_{33} \end{bmatrix} = \begin{bmatrix} p_1 p_1 & p_1 p_2 & p_1 p_3 \\ p_1 p_2 & p_2 p_2 & p_2 p_3 \\ p_2 p_3 & p_1 p_3 & p_3 p_3 \end{bmatrix},$$

the following relationship is confirmed $$\begin{vmatrix} a_{22} & a_{32} \\ a_{23} & a_{33} \end{vmatrix} = 0, \quad \begin{vmatrix} a_{11} & a_{21} \\ a_{12} & a_{22} \end{vmatrix} = 0, \quad \begin{vmatrix} a_{11} & a_{21} \\ a_{12} & a_{22} \end{vmatrix} = 0.$$

These are sufficient conditions of $I_2=0$. Thus, these conditions are used as a constraint for the second invariant. This reduces the number of variables involved in each equation, and these are compactly written as $a_{ij}^2 = a_{ii} a_{jj}$ for $(i,j)=\{(1,2),(1,3),(2,3)\}.$ Therefore, the constraint is defined as $g_{12}=a_{ij}^2 - a_{ii}a_{jj}=0$ for $(i,j)=\{(1,2),(1,3),(2,3)\}.$ In view of the above, the third invariant also should be zero, i.e., $I_3=det(a_2)=0.$ Consequently, when the previous condition for the second tensor invariant $I_2$ is satisfied, the above the third tensor invariant $I_3$ is satisfied as well.

Here, a non-limiting example of the optimization problem is provided for optimizing structural mechanics. In this example, the physical problem is to minimize the compliance when the component is in linear elastic equilibrium. This physical problem is formulated as $$\underset{\phi, a_{ij}}{\text{minimize}} \ F := \int_D f(u) d\Omega$$

subject to $\phi(x) \in [\underline{\phi}, \overline{\phi}]$ $q_{ij}(x) \in [\delta_{ij} - 1, 1]$ $g_v := \tilde{V}_d - \overline{V} \leq 0$ $g_{I1} := tr(a_2(x)) - 1 \leq 0$ $g_{I2} := a_{ij}^2(x) - a_{ii}(x) a_{jj}(x) = 0$ for $(i, j) = \{(1, 2), (1, 3), (2, 3)\}$ Filtering equations (1a) and (1b)

Governing equations (3)

Material interpolations (2a) and (2b), wherein $F:=\int_D f(u)d\Omega$ is the objective function, $\underline{\phi}$ and $\overline{\phi}$ are respectively the upper and lower bound for $\phi$, u is the state variable obtained by the governing equations in which the material properties are coupled with the density, $\rho$, plus the orientation tensors, $a_4$ and $a_2$, $\tilde{V}_d = \int \rho d\Omega$ is the volume of the structure and $\overline{V}$ is an upper bound for the volume of the structure.

The governing equations are the elastic equilibrium equations as follows;

$$-\nabla \cdot \sigma = 0 \text{ in } D$$

$$u = 0 \text{ on } \Gamma_d$$

$$\sigma \cdot n = t \text{ on } \Gamma_n, \qquad \text{Eq. (3)}$$

and, the constitutive laws are described as $$\sigma = C(\rho, a_4, a_2) \cdot \varepsilon,$$

wherein $$\varepsilon = \frac{1}{2}(\nabla u + \nabla u^T).$$

The first tensor invariant constraints for $I_1$ is a point-wise linear constraint, and the second tensor invariant constraint for $I_2$ is a quadratic constraint. These point-wise linear and quadratic constraints involve multiple variables at each point.

In contrast to the methods described herein, a numerical solution incorporating these constraints could be a challenge for related methods that are numerically implemented using nonlinear math programming methods, as described above. This challenge is a result of the number of constraint to be solved on a point-by-point basis. However, for the methods described herein, these constraints are enforced with multi-variable function projection, as opposed to be addressed on a point-by-point basis.

Additionally, the methods described herein are applicable to other physics problems beyond the structural-mechanics problem used above to illustrate the method. These other physics problems to which the method can be applied include: electromagnetic, heat transfer, thermal-structural, and magnetic-thermal-fluid problems. For example, the mechanical response of a fiber composite material to a given input (i.e., a load) is governed by a uniaxial tensor (e.g., the elasticity tensor). Similarly, in other physical systems (e.g., electromagnetic, heat transfer, thermal-structural, and magnetic-thermal-fluid problems) the response of the system to a given input can also be governed by a uniaxial tensor (e.g., the piezo-electric tensor, pyro-electric tensor, ferroelectric tensor, ferromagnetic tensor, electric permeability tensor, magnetic permeability tensor, thermal or electrical conductivity tensors, etc.). Accordingly, the methods described herein, which are illustrated using a non-limiting example from structural mechanics, can be applied to other physical systems. For example, similar to how the illustrative example uses the orientation tensor $a_2$ to calculate a solid elastic tensor $C_s$ and then uses the solid elastic tensor to numerical simulating the governing partial differential equations (PDEs), the method can also be used to calculate the physics tensors of other physical system, and those physics tensors can then be used to perform a simulate the physics of the other physical system by numerical simulating the governing partial differential equations (PDEs) for those systems.

The advantages of the methods described herein can be better understood by comparing then to the related methods. Now, the methods described herein are compared with two related methods.

The first related method, which is also described above, is performed by listing up all constraints at every design point after discretization and solving a math programming problem with the listed up constraints. This is the most straight-forward approach with the best accuracy, potentially, and used in free material optimization (FMO). However, this brute-force approach involves a large number of nonlinear constraints which is a detriment to most math programming algorithms for constrained optimization.

Another related method uses aggregated constraints. That is, rather than constrain on a point-wise basis, the point-wise constraint function is integrated over a volume, and the constraint is imposed on a volume-integrated value. Thus, many constraints are consolidated into a few (or a single) constraints. This approach can require only one constraint per each type of constraint condition per integration volume (e.g., the integration volume can be the entire domain). This approach can be effective with the above-described constraints, and can also be effective with even more complicated constraints, such as point-wise stress constraints. However, using aggregated constraints yields less accurate results due to discrepancies between local values and the average value in the entire domain.

The strategy applied in the methods described herein is to convert the constraint to a projection. This approach is effective in the case where the constraint function is explicit and relatively simple. Generally, the constraint can be converted to a projection, for example, by augmenting a projection definition (e.g., the Heaviside projection), or by adding a new projection, in the continuous regime before discretization. Because the constraint-to-projection approach preserves that the constraint is enforced on a point-wise basis, this approach does not suffer from the local-average discrepancy issue encountered in the aggregation approach above. Also, the constraint-to-projection approach avoids the large number of the constraints proliferated in the first related method. Accordingly, it can be implemented using a standard topology optimization framework by changing the material interpolation function. Consequently, it adds virtually no additional computational costs relative to isotropic optimization methods. In the non-limiting example illustrated herein, the constraint-to-projection approach is applied to: (i) three-dimensional shell problems, (ii) to combinatorial problems, and (iii) to tensor invariant constraints.

As illustrated in FIG. 1B, the tensor invariants can be enforce using one or more mappings (e.g., projections) between the mathematical design variables 115 $q_{ij}$ and the physical design variables 125 $a_{ij}$. These mappings ensure that the physical design variables 125 $a_{ij}$ conform to the constraints while the mathematical design variables 115 $q_{ij}$ can be updated without expressly considering the constraints corresponding to the tensor invariants. In the non-limiting implementation shown in FIG. 1B, the first tensor invariant constraint $I_1$ and the second tensor invariant constraint $I_2$ are addressed using two separate mappings/projections.

The first tensor invariant constraint $I_1$ relates to only the diagonal elements of the orientation tensor, $a_{ii}$. Combined with the box constraints, this defines a tetrahedral domain as $$0 \leq a_{11} \leq 1$$

$$0 \leq a_{22} \leq 1$$

$$0 \leq a_{33} \leq 1$$

$$a_{11} + a_{22} + a_{33} \leq 1.$$

Here, the first tensor invariant constraint $I_1$ is addressed using an 8-node linear hexahedral isoparametric shape function N. The 8-node linear hexahedral isoparametric shape function N is used as a non-limiting example. The Heaviside projection function is augmented with this shape function as follows for the diagonal elements;

$$a_{ii}(\tilde{q}_{ii}) = N(2\tilde{R}(2\tilde{q}_{ii} - 1) - 1).$$

N is the shape function with vertex information that is:

$$N(\xi, \eta, \zeta) = \sum_{i=1}^{8} N_i(\xi, \eta, \zeta) v_i$$

wherein $\xi$, $\eta$ and $\zeta$ are coordinate components in the natural coordinate system and $v_i$ is the position of i-th element vertex in the real coordinate system, and $N_1 = (1-\xi)(1-\eta)(1-\zeta)/8$ $N_2 = (1+\xi)(1-\eta)(1-\zeta)/8$ $N_3 = (1+\xi)(1+\eta)(1-\zeta)/8$ $N_4 = (1-\xi)(1+\eta)(1-\zeta)/8$ $N_5 = (1-\xi)(1-\eta)(1+\zeta)/8$ $N_6 = (1+\xi)(1-\eta)(1+\zeta)/8$ $N_7 = (1+\xi)(1+\eta)(1+\zeta)/8$ $N_8 = (1-\xi)(1+\eta)(1+\zeta)/8.$ By having an element with a tetrahedral shape, the projected values are constrained to be in the tetrahedral domain. The tetrahedron shape for the $I_1$ constraint is defined by;

$0 \leq x \leq 1$ $0 \leq y \leq 1$ $0 \leq z \leq 1$ $x + y + z \leq 1$

This domain can be formed with the hexahedral element by giving the following vertices set $v_i$;

$v_1 = (0,0,0)$ $v_2 = (1,0,0)$ $v_3 = (½, ½, 0)$ $v_4 = (0,1,0)$ $v_5 = (0,0,1)$ $v_6 = (½, 0, ½)$ $v_7 = (⅓, ⅓, ⅓)$ $v_8 = (0, ½, ½).$

As a consequence, $\tilde{q}_{ii}$ is projected as $a_{ii}$ in the tetrahedral bound and the original constraint is held as depicted in FIG. 2A. FIG. 2A shows a multi-variable function projection using hexahedral shape function for converting the $I_1$ constraint to a projection. The $I_1$ constraint mapping/projection has the diagonal elements $q_{ii}$ of the mathematical design variables 115 as inputs and has the diagonal elements $a_{ii}$ of the physical design variables 125 as outputs.

A second mapping ensures that the off-diagonal elements $a_{ij}$ of the physical design variables 125 satisfy the second tensor invariant $I_2$ constant, at least approximately. For the second mapping to be numerical well-behaved (e.g., the mapping function is differentiable), the second tensor invariant $I_2$ is only approximately enforced, rather than being strictly enforced. This approximate enforcement of the second tensor invariant is sufficient.

For keeping the second tensor invariant $I_2$ constant, a second projection is introduced. The second tensor constraint $I_2$ can be transformed as follows;

$$a_{ij}^2 = a_{ii} a_{jj}$$

$$a_{ij} = \begin{cases} -\sqrt{a_{ii} a_{jj}} : & a_{ij} \geq 0 \\ -0 : & a_{ij} = 0 \\ -\sqrt{a_{ii} a_{jj}} : & a_{ij} < 0 \end{cases}$$

$$a_{ij} = \text{sgn}(a_{ij}) \sqrt{a_{ii} a_{jj}}$$

$$a_{ij} = (2H_{1/2}(a_{ij}) - 1) \sqrt{a_{ii} a_{jj}}.$$

This projection for the off-diagonal terms would strictly enforce the second tensor constraint $I_2$, but the Heaviside function $H_{1/2}$ can introduce complications when the optimization is implemented numerically. Accordingly, numerical implementation can be improved by relaxing the second tensor constraint $I_2$ and this equation for the off-diagonal terms can be converted to a projection with relaxation by augmenting the expression for $a_2$ as follows;

$$a_{ij} = \sqrt{a_{ii} a_{jj}} (2\tilde{R}(\tilde{q}_{ij}) - 1).$$

This equation is used to project filtered off-diagonal tensor design variables to the off-diagonal elements of the unidirectional tensor for material property interpolation.

More details regarding a non-limiting example of the smoothed ramp function, $\tilde{R}$, are now provided. The smoothed ramp function, $\tilde{R}$, is used in the projection of the orientation tensor design variables $\tilde{q}_{ii}$. In the non-limiting example, the function used in these equations is based on a ramp function with a slope that starts at $-1$ and stops at 1 with the value 1 defined as follows;

$R(x) = ½(x+1)H(x+1) - ½(x-1)H(x-1).$

To make the above function differentiable, two discontinuous hinge parts (x=−1,1) are modified with the following connection function.

$$\tilde{F}(x) = h\left\{-\frac{1}{16}\left(\frac{x}{h}\right)^4 + \frac{3}{8}\left(\frac{x}{h}\right)^2 + \frac{1}{2}\left(\frac{x}{h}\right) + \frac{3}{16}\right\} \quad (-h \leq x \leq h)$$

By inserting the above function at both hinge parts, the differentiable version of R with $C^2$ continuity is obtained as $$\tilde{R}(x) = \begin{cases} 0 & (x < -1 - h) \\ \frac{1}{2}\tilde{F}(x+1) & (-1 - h \leq x < -1 + h) \\ \frac{x}{2} + \frac{1}{2} & (-1 + h \leq x < 1 - h) \\ 1 - \frac{1}{2}\tilde{F}(-x+1) & (1 - h \leq x < 1 + h) \\ 1 & (1 + h < x). \end{cases}$$

The value of h for $\tilde{R}$ is set to 0.1. A plot of this function and other smoothed step functions that can be used in this method are shown in FIG. 2B.

In the non-limiting example of structural-mechanics optimization, the optimization problem is formulated in a nested style that involves a finite element analysis, at step 130, to calculate a value of an objective function. More generally, step 134 can be performed using any numerical partial differential equation (PDE) solution method that can be applied to the physical problem being addressed (e.g., in addition to the FEA approach, a finite difference equation approach, method or moments approach, or other PDE simulation approach can be used). When the convergence criteria have not yet been satisfied, the current configuration of the component is used to calculate the sensitivity of the objective function to changes in various directions of the search space (e.g., the sensitivity can be determined using a gradient and in some implementations a second-order derivative), thereby obtaining information to update design variables by a math programming algorithm to perform the optimization. For example, the numerical results provided below were generated using simulation (i.e., finite element analysis) performed using the commercial software package Comsol 5.2™ and the optimization step is performed using Optimization module for Comsol 5.2™. For optimization, a standard nonlinear math programming method can be used, and a globally convergent method of moving asymptotes (GCMMA) is used to generate the illustrative results provided below.

In this illustrative example, convergence is monitored every 10 iterations. The criterion is as follows;

$$(f_{k-10} - f_k)/f_k < \varepsilon,$$

wherein $f_{k-10}$ and $f_k$ are respectively the objective function value at 10 iterations before, current iteration, and $\varepsilon$ is a convergence threshold. Continuation scheme is applied to some numerical examples for the penalty parameter p in Eq. (2a) for the constitutive tensor $C_\rho$ in the beginning and the transition bandwidth h of the relaxed Heaviside function, at the end of optimization. The penalty parameter p starts with 1 and increases by 1 for every 10 iterations to 3. The transition bandwidth h starts with 1 and decreases by ⅓ for convergence to ⅓ after first convergence.

TABLE 1

Values used for Halpin-Tsai model for a uniaxial material

| Symbol | Value | Description |
| --- | --- | --- |
| $E_f$ | 1 | Normalized Young's modulus of reinforcement material |
| $E_m$ | 1/15 | Relative Young's modulus of matrix material |
| $v_f$ | 0.22 | Poisson ratio of reinforcement material |
| $v_m$ | 0.38 | Poisson ratio of matrix material |
| $f_f$ | 0.5 | Default fiber volume fraction of composite |
| $r_\phi, r_q$ | 0.025 | Filter radius for design variable |
| $\underline{\phi}, \overline{\phi}$ | −1, 1 | Upper and lower bound for $\phi$ |
| h | 1, ⅔, ⅓ | Transition bandwidth of regularized Heaviside function |
| p | 1, 2, 3 | Penalty parameter for density |
| $\varepsilon$ | $2 \times 10^{-2}$ | Convergence criterion |

Figure 3A:
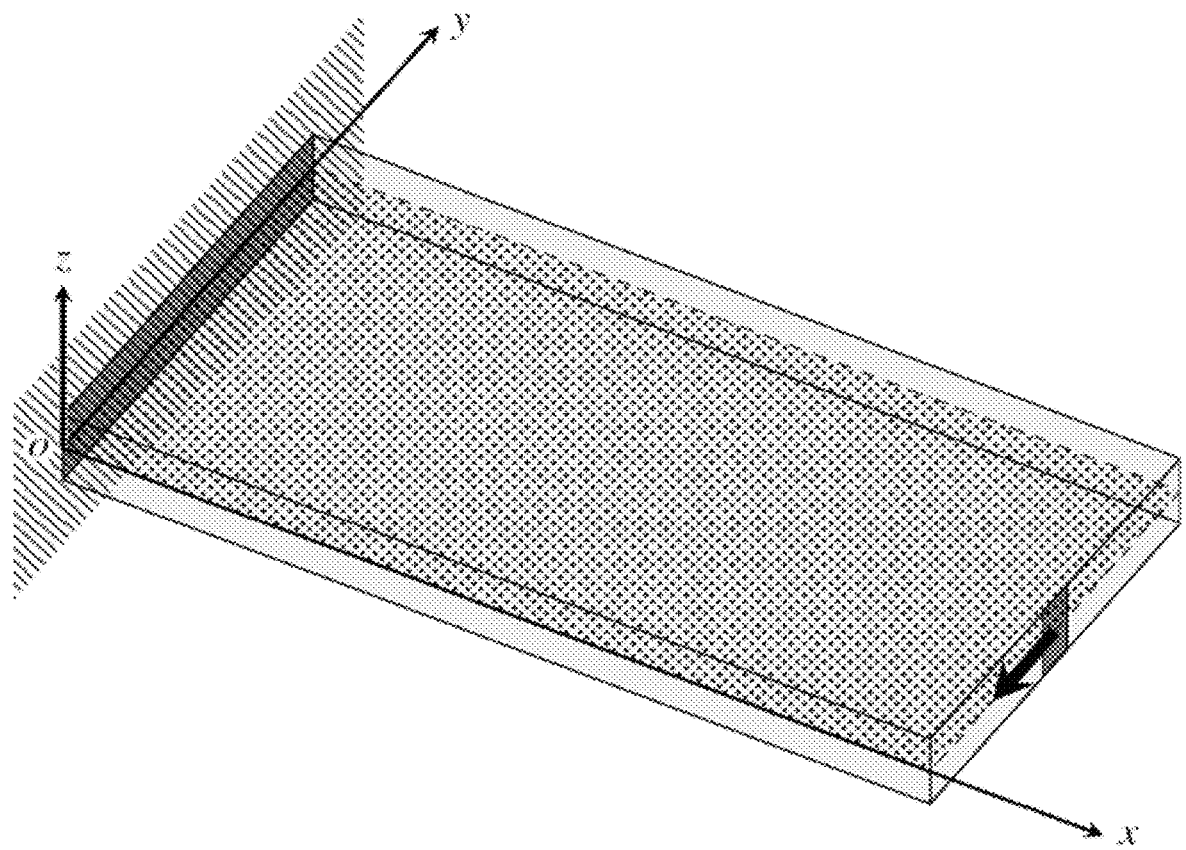
FIG. 3A shows a perspective view of a design domain and boundary conditions of center loaded in-plane short cantilever beam, according to one implementation.
Figure 3B:
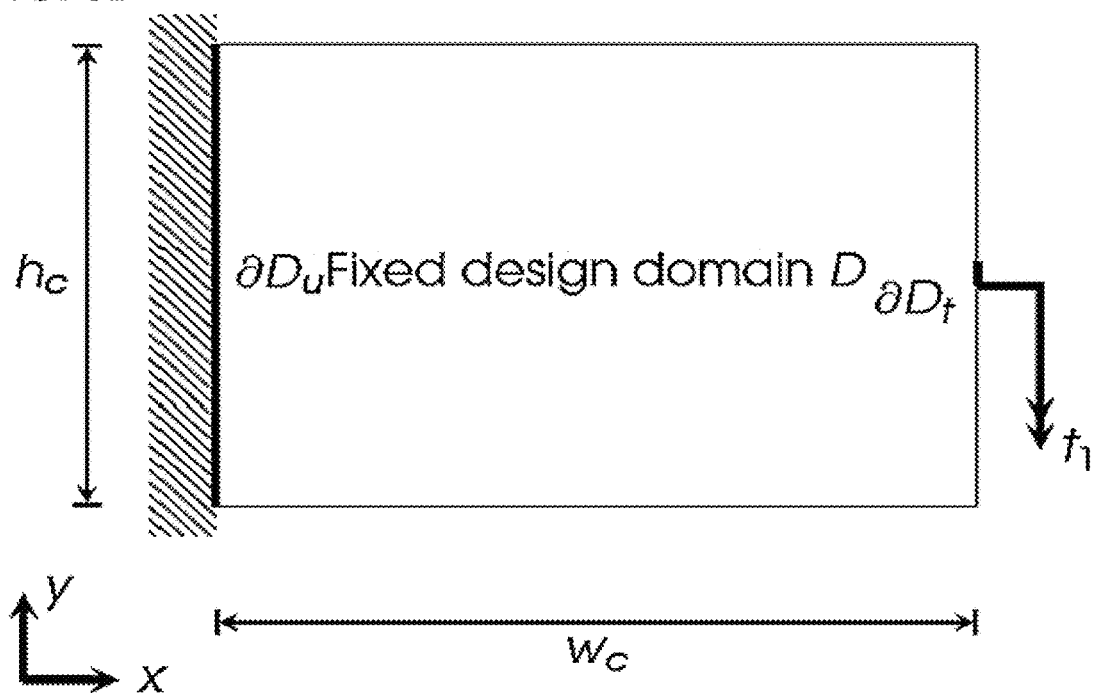
FIG. 3B shows a front view of the design domain and boundary conditions of the center loaded in-plane short cantilever beam, according to one implementation.

FIGS. 3A and 3B show a first example in which a short cantilever beam problem in a planar structure is used to illustrate the method of tensor-based optimization. The design domain is a simple planar rectangle shape; an in-plane center loaded cantilever beam problem is considered. Even though the design domain is a thin flat shape, it is a three-dimensional structure with finite thickness which is placed in a three-dimensional space with various angle settings to observe angular dependency. FIG. 3A shows the design domain and boundary conditions. A thin rectangular box is located in the three-dimensional Cartesian coordinate system. The size of the box is 2 by 1 for the x and y direction, respectively, with thickness 0.050. The shorter face at the origin side, shown as a gray face on a hatched plane, is under a fixed boundary condition and a force is loaded in the −y direction at the center of the opposite face. A symmetry boundary condition is applied on the mid surface to constrain deformation to be in plane.

Figure 4A:
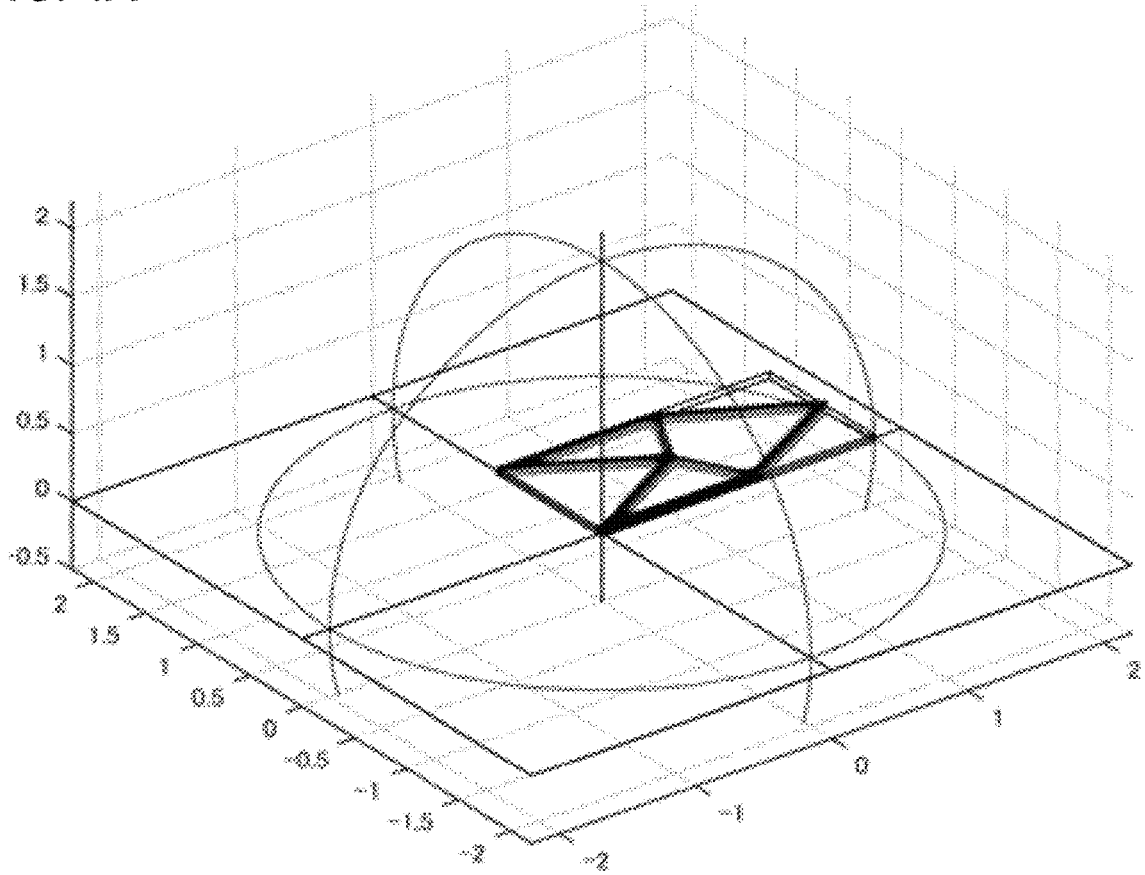
FIG. 4A shows the center loaded in-plane short cantilever beam for a design domain orientation of (0°, 0°, 0°) for the ZYX Euler angle.
Figure 4B:
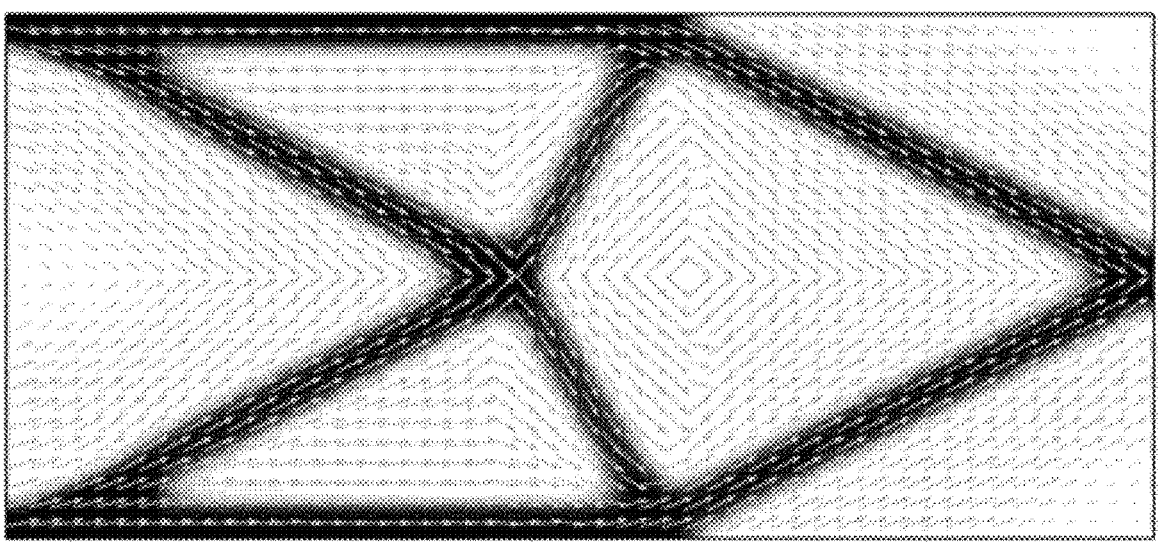
FIG. 4B shows an optimized orientation and topology for the design domain orientation in FIG. 4A.
Figure 4C:
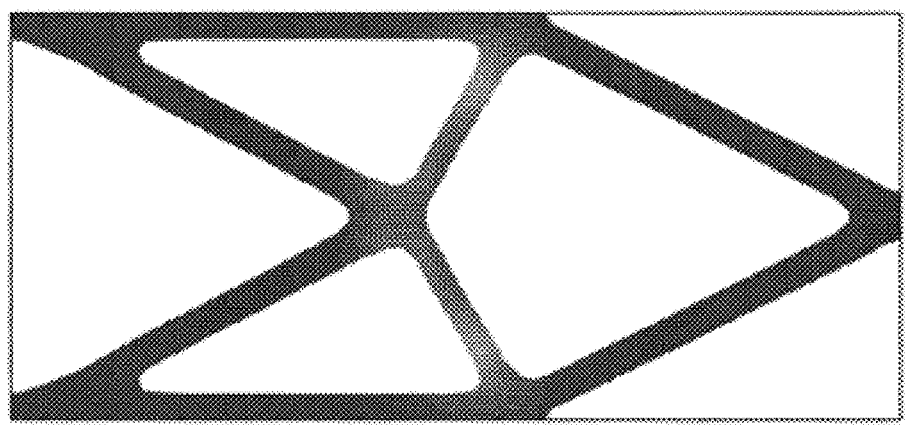
FIG. 4C shows a plot of the first tensor invariant $I_1$ for the orientation and topology corresponding to FIG. 4A.
Figure 4C:
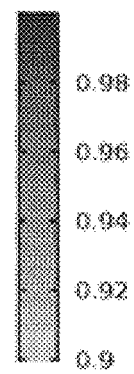
Figure 4D:
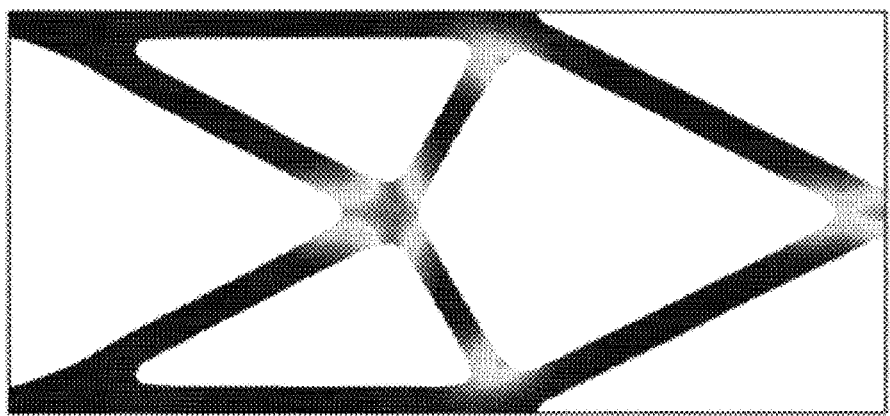
FIG. 4D shows a plot of the second tensor invariant $I_2$ for the orientation and topology corresponding to FIG. 4A.
Figure 4D:
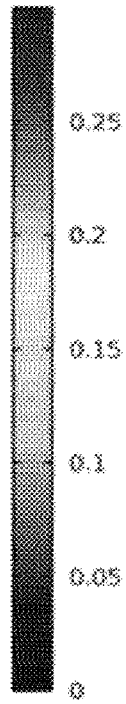
Figure 4E:
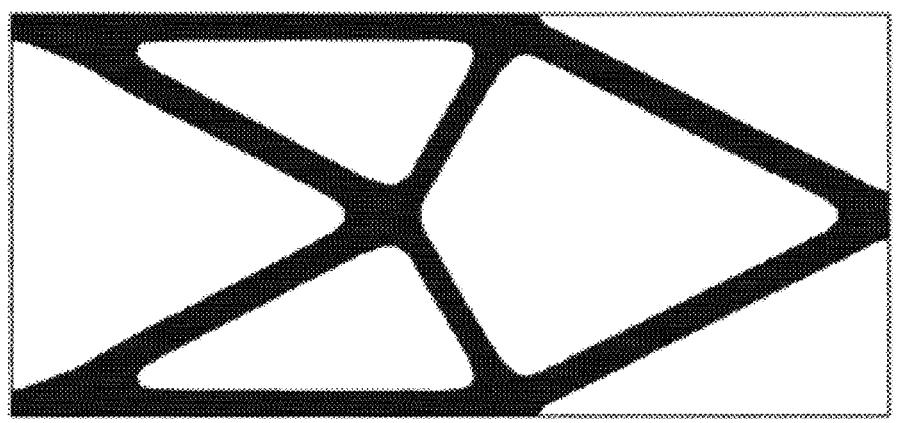
FIG. 4E shows a plot of the third tensor invariant $I_3$ for the orientation and topology corresponding to FIG. 4A.
Figure 4E:
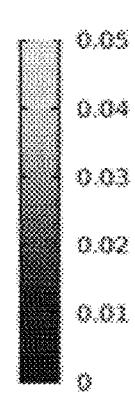

FIGS. 4A-4E show results for a numerical simulation when the rotation angle for the ZYX Euler angle is (0°, 0°, 0°). FIG. 4A shows the arrangement of the cantilever beam within the real coordinate system. FIG. 4B shows the optimized topology/distribution and orientation of the uniaxial material. FIGS. 4C-4E show, as a function of position, the values for the $I_1$, $I_2$, and $I_3$ tensor invariants, respectively. The first tensor invariants $I_1$ should have a value of one or less, and it does, as seen in FIG. 4C. The second tensor invariants $I_2$ should have a value of zero, which it mostly does except near the joints where the orientation changes, as seen in FIG. 4D. Recall that the second projection/mapping substantially enforces the second tensor invariants $I_2$ but uses a numerically well-behaved (e.g., differentiable) projection rather strictly enforcing the second tensor invariant $I_2$. Here, this is good enough to achieve an optimized configuration for the cantilever beam. A tensor invariant is substantially enforced, when as a practical matter, it is kept within 30% of its ideal value (e.g., $I_2 < 0.3$). The third tensor invariants $I_3$ should have a value of zero, and it essentially does, as seen in FIG. 4E. These results are referred to herein as case (a).

Figure 5A:
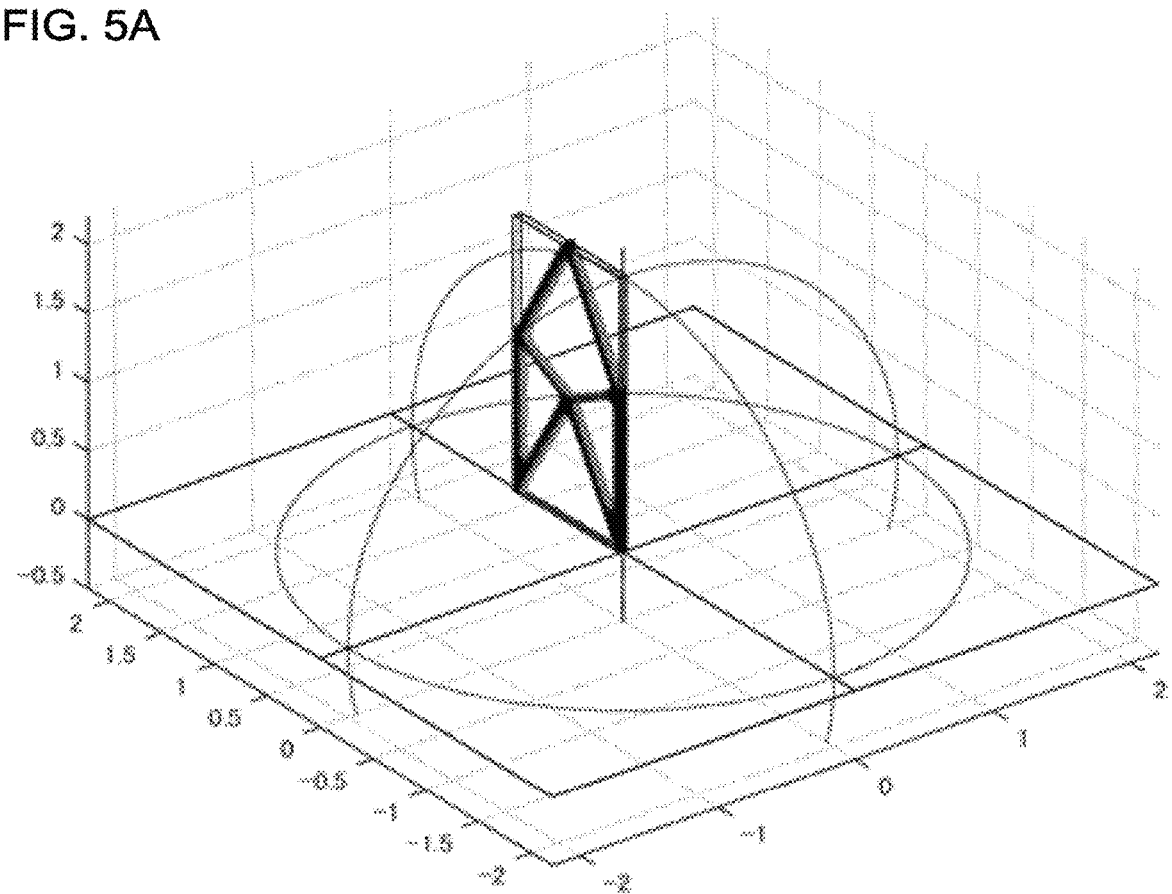
FIG. 5A shows the center loaded in-plane short cantilever beam for a design domain orientation of (0°, 90°, 0°) for the ZYX Euler angle.
Figure 5B:
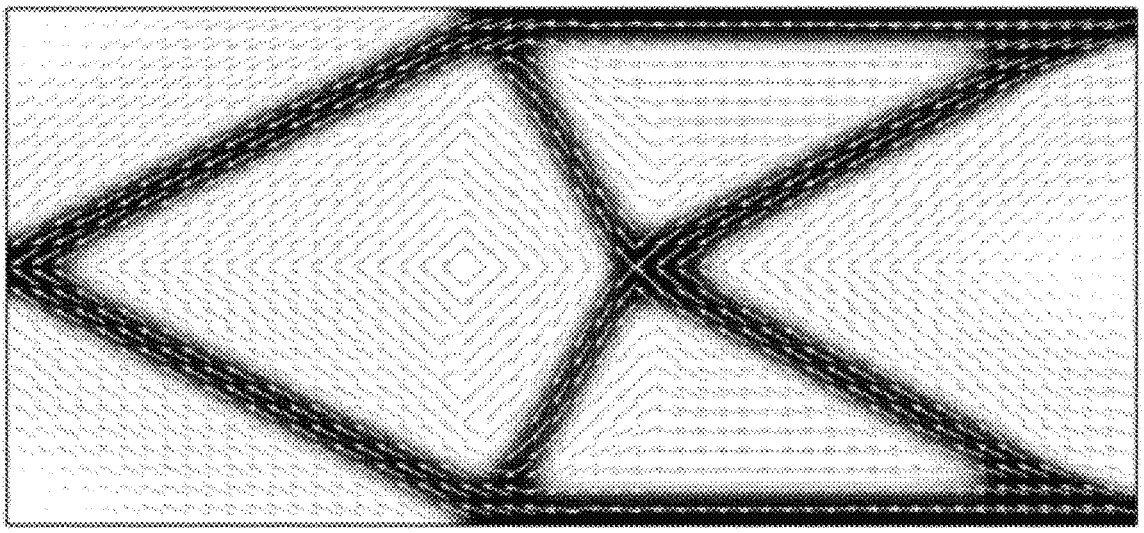
FIG. 5B shows an optimized orientation and topology for the design domain orientation in FIG. 5A.

FIGS. 5A and 5B show results for a numerical simulation when the rotation angle for the ZYX Euler angle is (0°, 90°, 0°). FIG. 5A shows the cantilever beam in the real coordinate system, and FIG. 5B shows the optimized topology/distribution and orientation. These results are referred to herein as case (b).

Figure 6A:
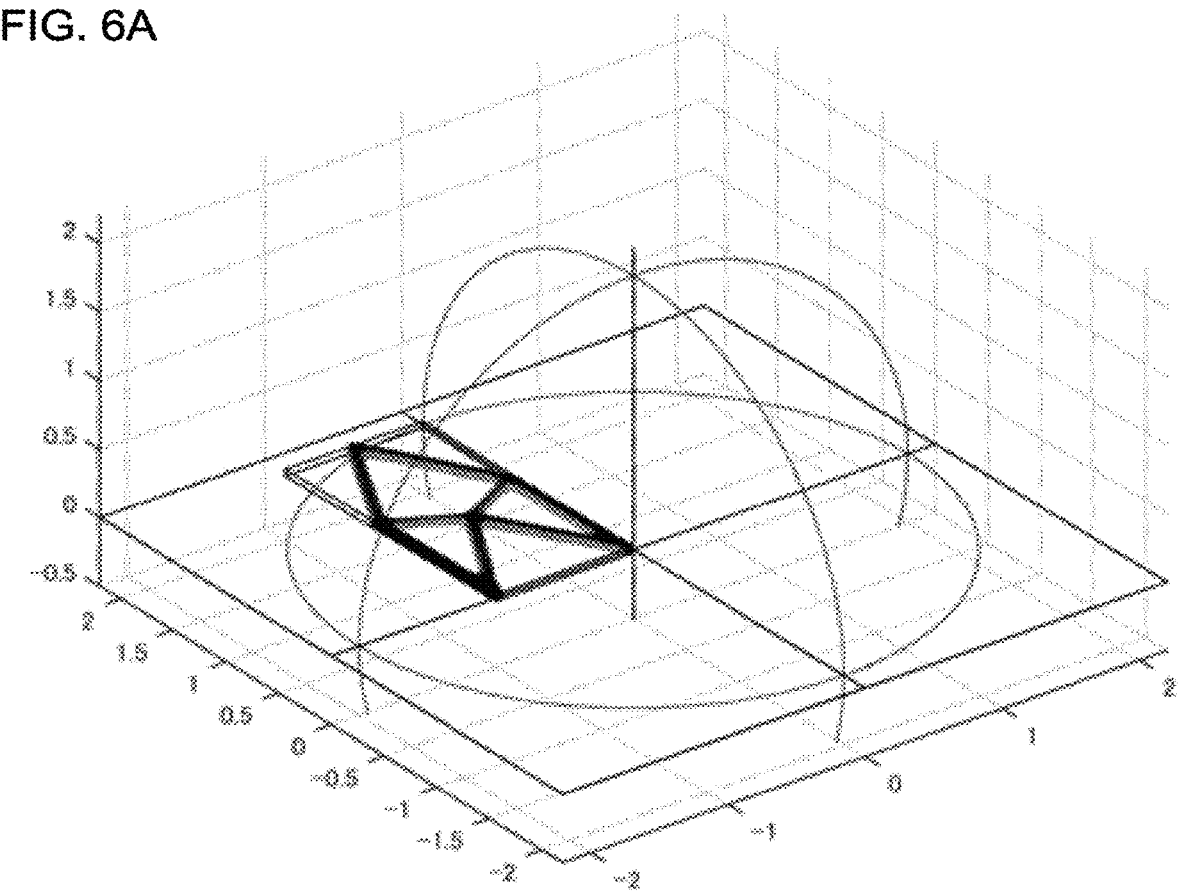
FIG. 6A shows the center loaded in-plane short cantilever beam for a design domain orientation of (90°, 0°, 0°) for the ZYX Euler angle.
Figure 6B:
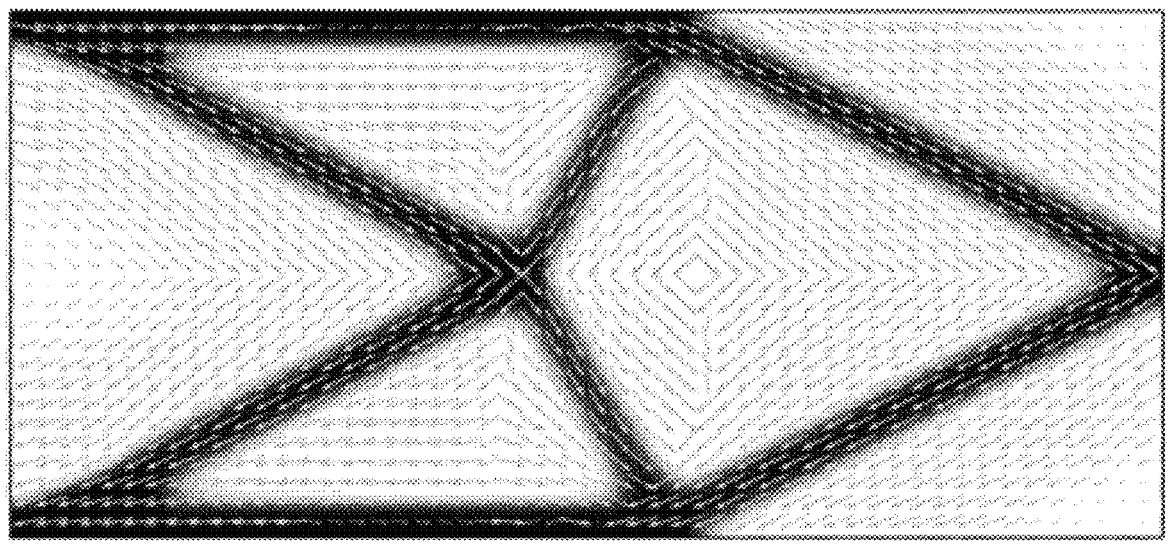
FIG. 6B shows an optimized orientation and topology for the design domain orientation in FIG. 6A.

FIGS. 6A and 6B show results for a numerical simulation when the rotation angle for the ZYX Euler angle is (90°, 0°, 0°). FIG. 6A shows the cantilever beam in the real coordinate system, and FIG. 6B shows the optimized topology/distribution and orientation. These results are referred to herein as case (c).

Figure 7A:
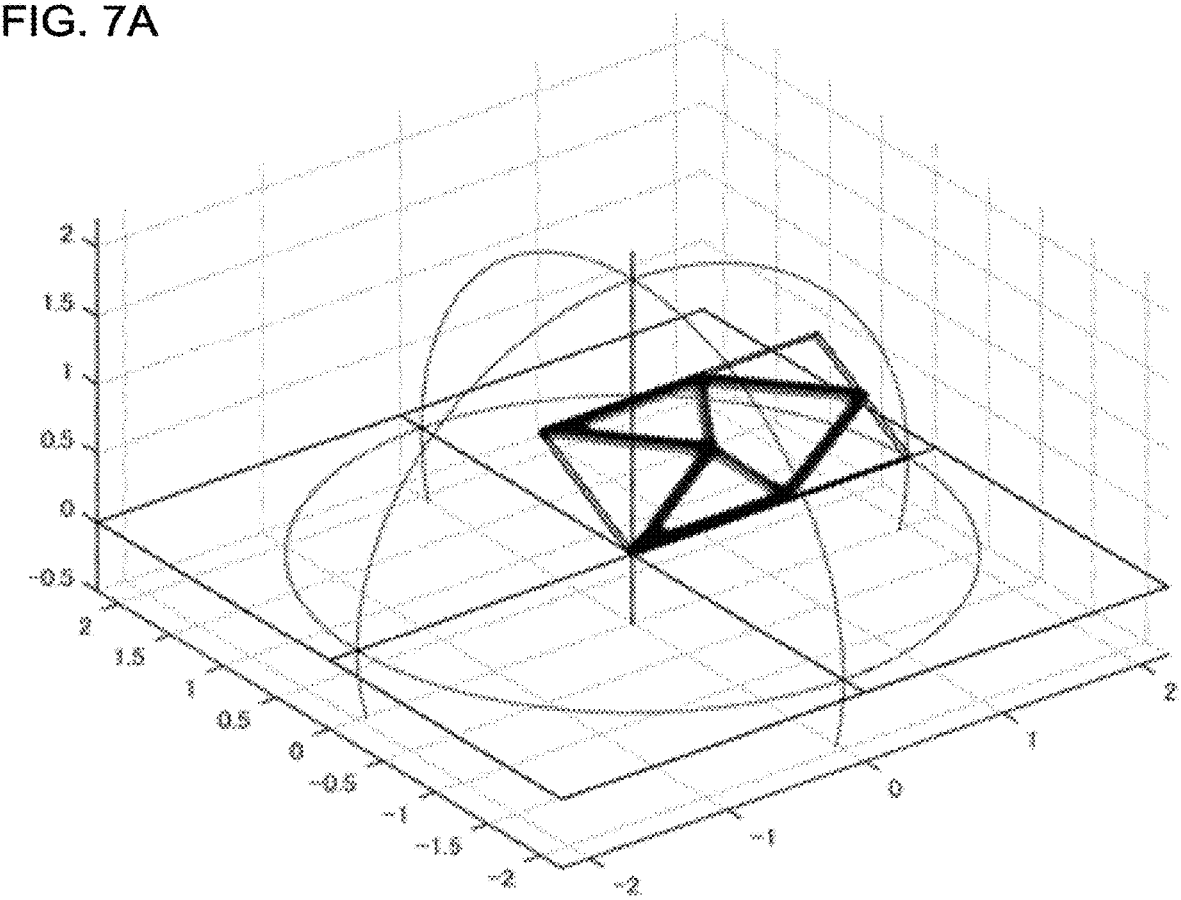
FIG. 7A shows the center loaded in-plane short cantilever beam for a design domain orientation of (0°, 0°, 30°) for the ZYX Euler angle.
Figure 7B:
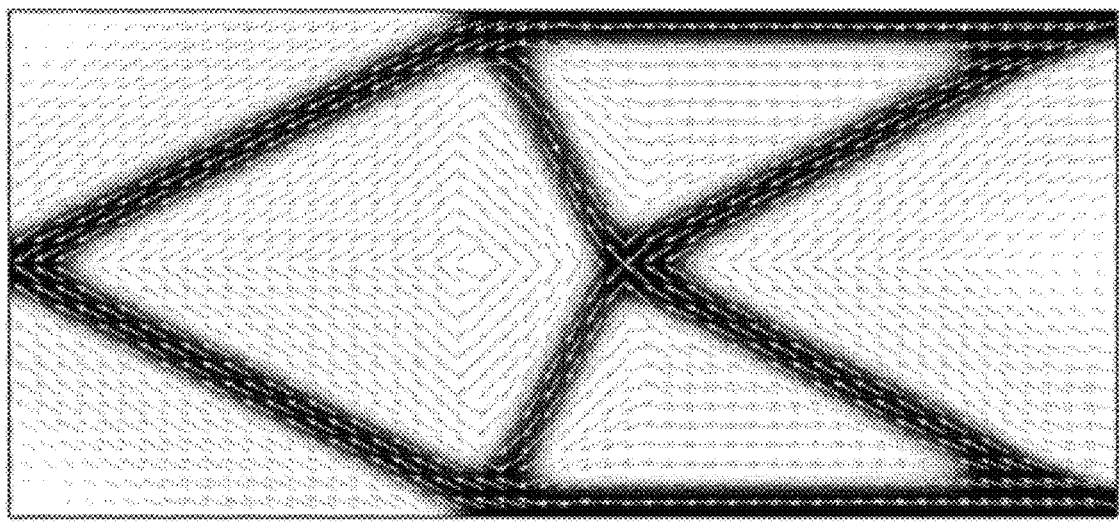
FIG. 7B shows an optimized orientation and topology for the design domain orientation in FIG. 7A.
Figure 7C:
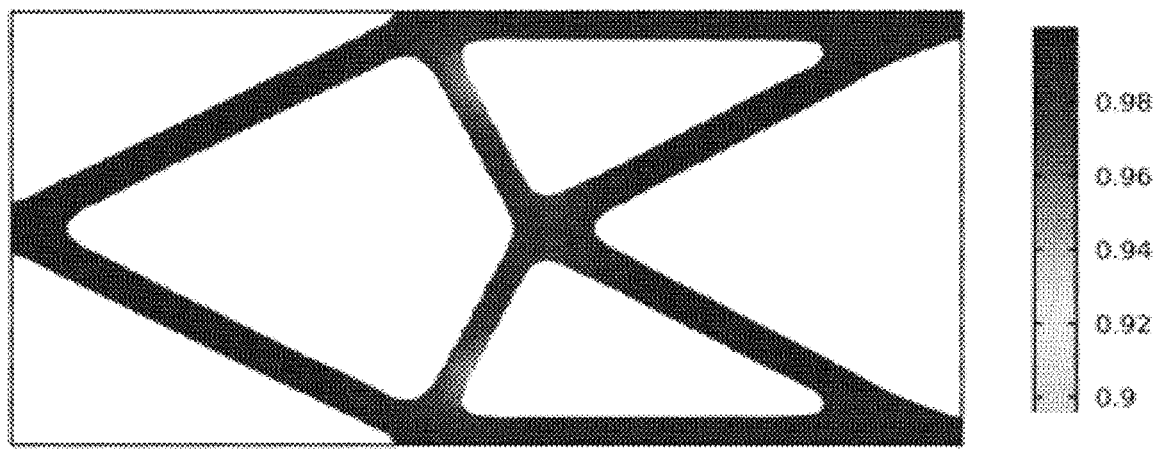
FIG. 7C shows a plot of the first tensor invariant $I_1$ for the orientation and topology corresponding to FIG. 7A.
Figure 7D:
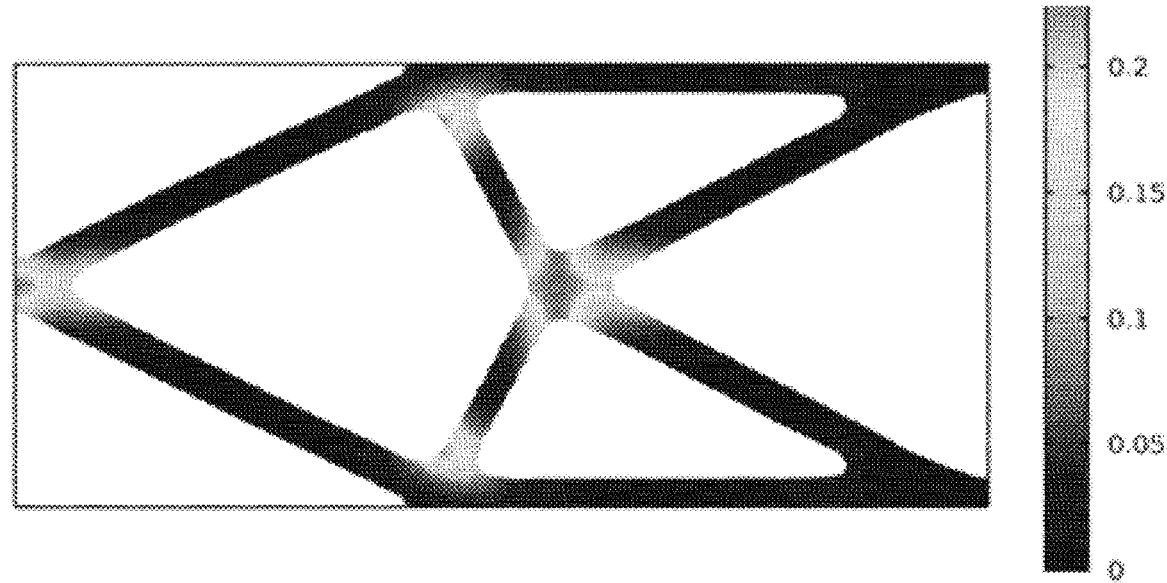
FIG. 7D shows a plot of the second tensor invariant $I_2$ for the orientation and topology corresponding to FIG. 7A.

FIGS. 7A and 7B show results for a numerical simulation when the rotation angle for the ZYX Euler angle is (0°, 0°, 30°). FIG. 7A shows the cantilever beam in the real coordinate system, and FIG. 7B shows the optimized topology/distribution and orientation. FIGS. 7C and 7D show the values for the $I_1$ and $I_2$ respectively. These results are referred to herein as case (d).

Figure 8A:
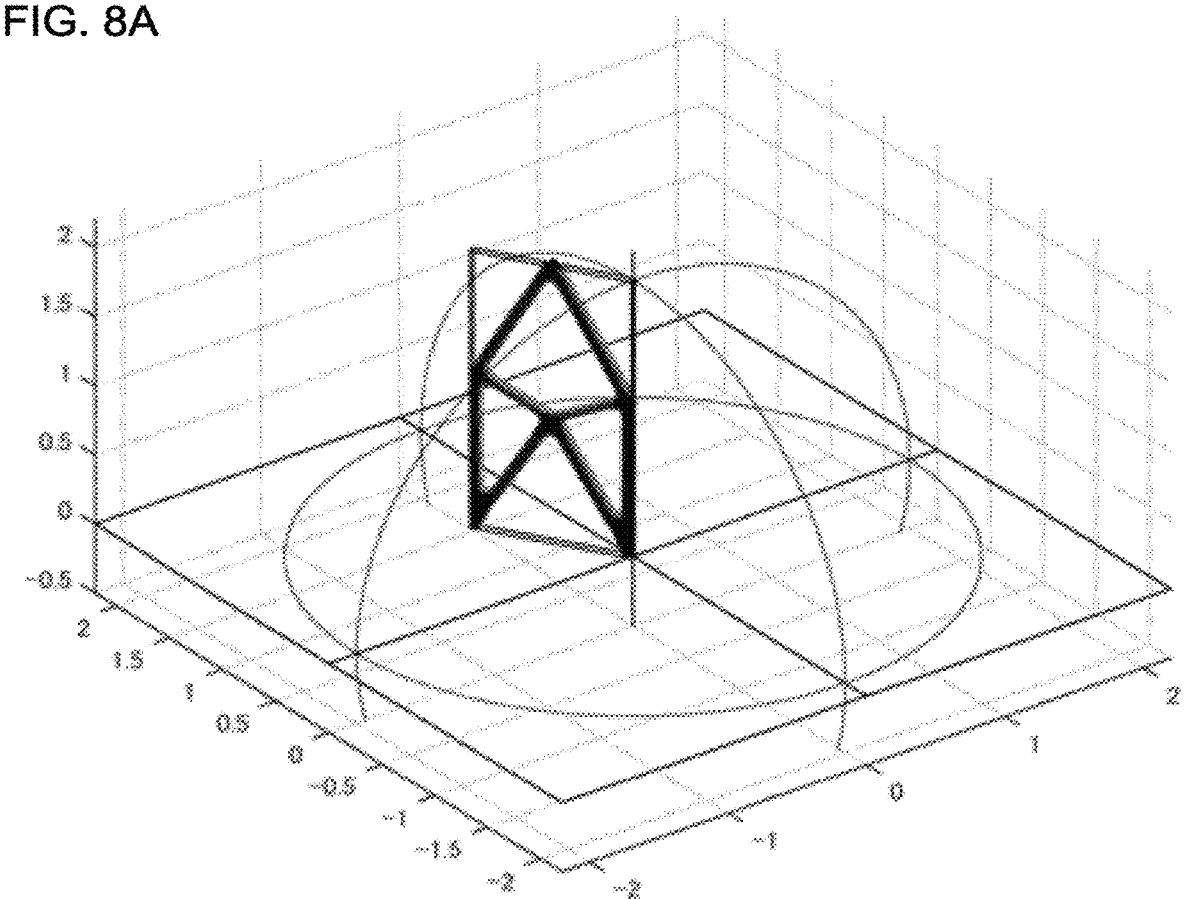
FIG. 8A shows the center loaded in-plane short cantilever beam for a design domain orientation of (0°, 90°, 30°) for the ZYX Euler angle.
Figure 8B:
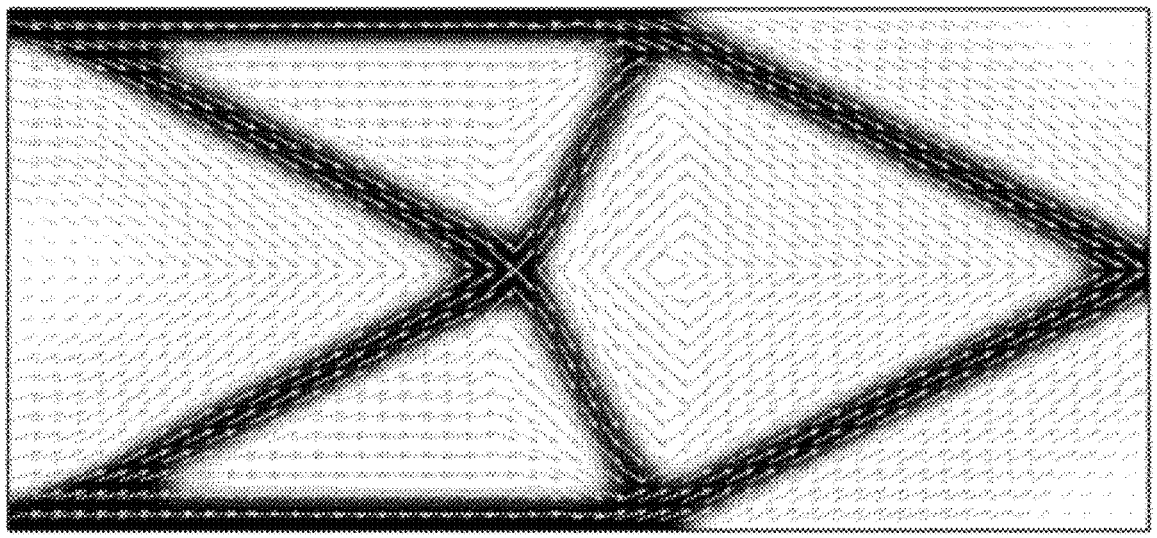
FIG. 8B shows an optimized orientation and topology for the design domain orientation in FIG. 8A.

FIGS. 8A and 8B show results for a numerical simulation when the rotation angle for the ZYX Euler angle is (0°, 90°, 30°). FIG. 8A shows the cantilever beam in the real coordinate system, and FIG. 8B shows the optimized topology/distribution and orientation. These results are referred to herein as case (e).

Figure 9A:
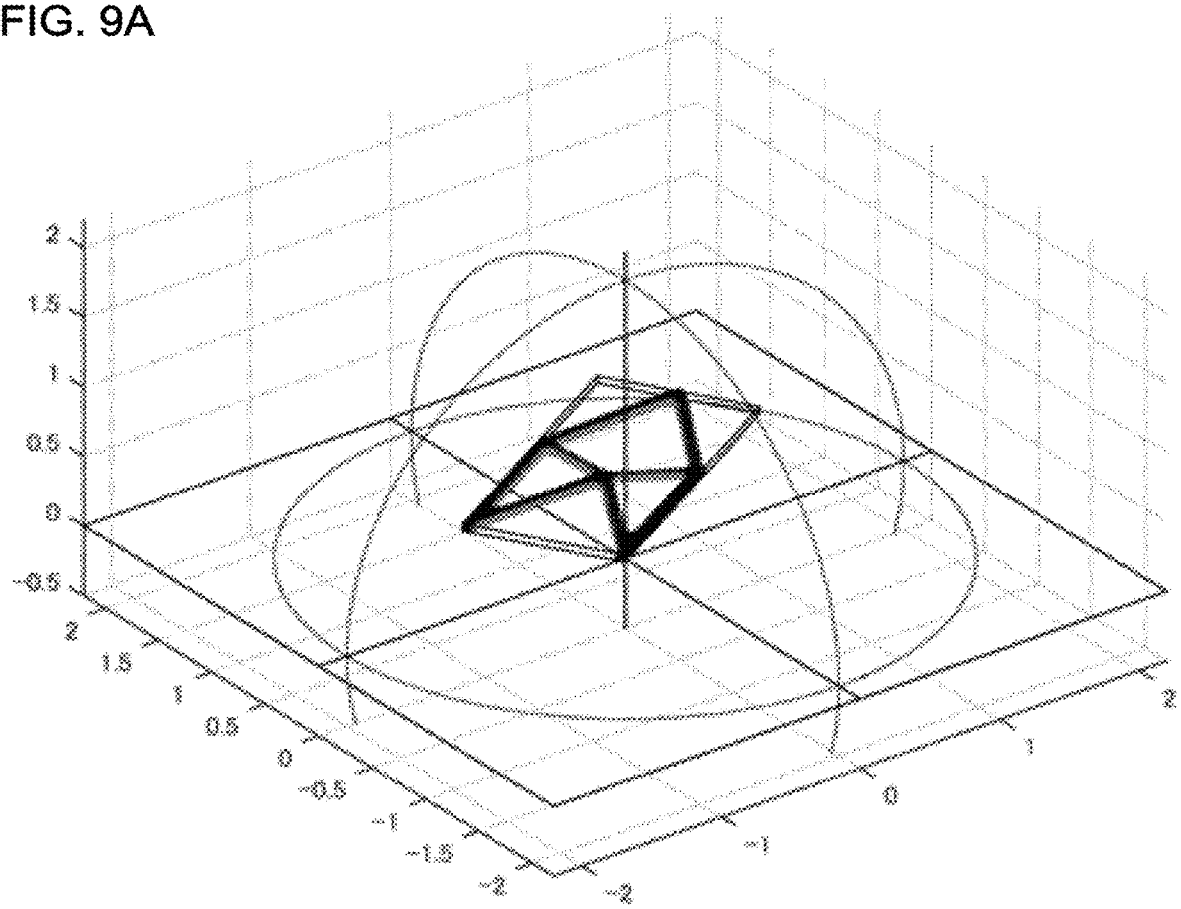
FIG. 9A shows the center loaded in-plane short cantilever beam for a design domain orientation of (30°, 0°, 0°) for the ZYX Euler angle.
Figure 9B:
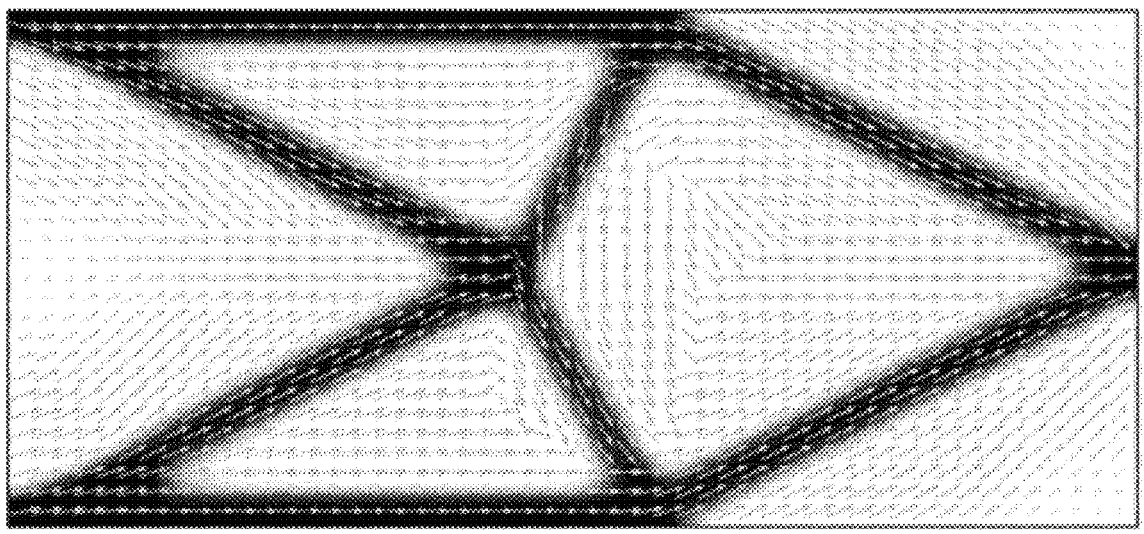
FIG. 9B shows an optimized orientation and topology for the design domain orientation in FIG. 9A.
Figure 9C:
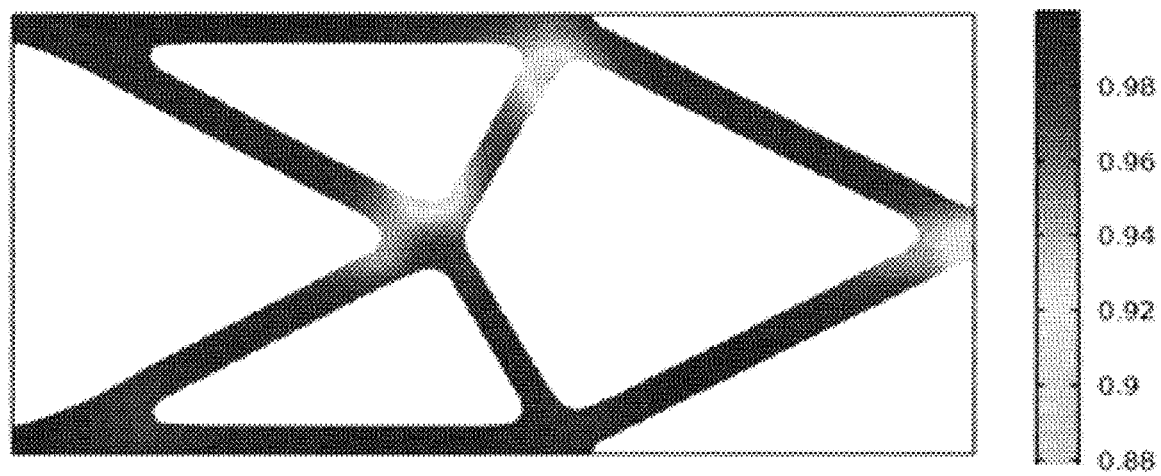
FIG. 9C shows a plot of the first tensor invariant $I_1$ for the orientation and topology corresponding to FIG. 9A.
Figure 9D:
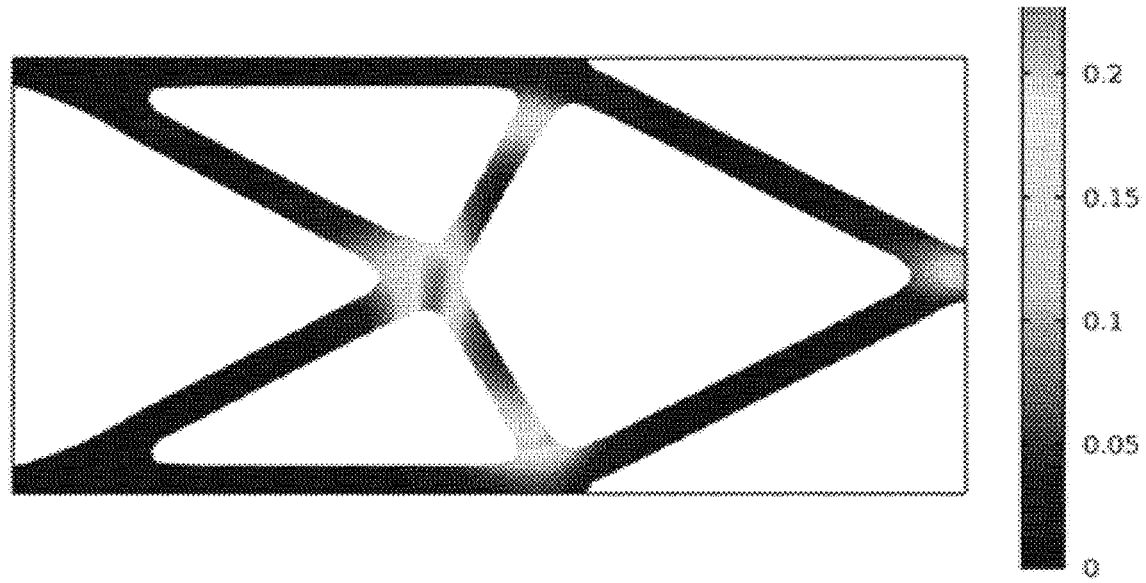
FIG. 9D shows a plot of the second tensor invariant $I_2$ for the orientation and topology corresponding to FIG. 9A.

FIGS. 9A and 9B show results for a numerical simulation when the rotation angle for the ZYX Euler angle is (30°, 0°,0°). FIG. 9A shows the cantilever beam in the real coordinate system, and FIG. 9B shows the optimized topology/distribution and orientation. FIGS. 9C and 9D show the values for the $I_1$ and $I_2$ respectively. These results are referred to herein as case (f).

Figure 10A:
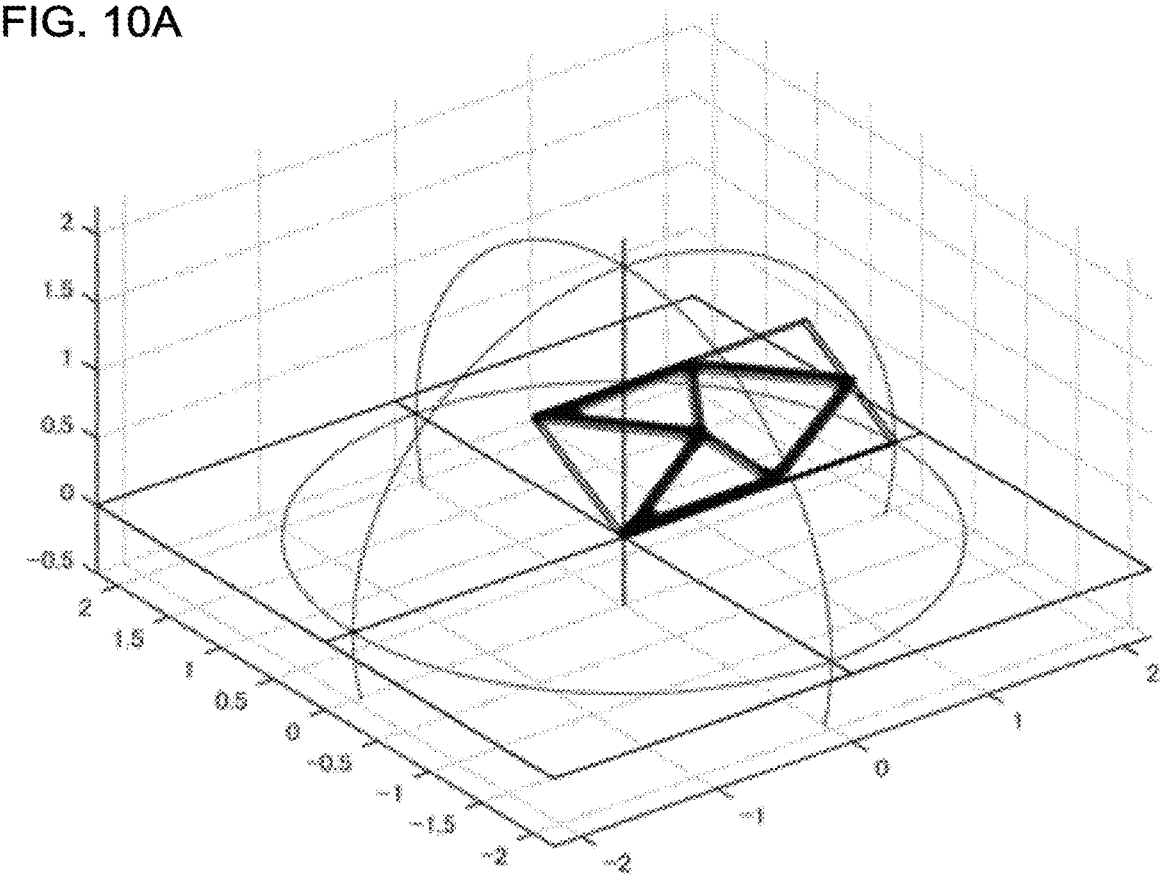
FIG. 10A shows the center loaded in-plane short cantilever beam for a design domain orientation of (0°, 30°, 90°) for the ZYX Euler angle.
Figure 10B:
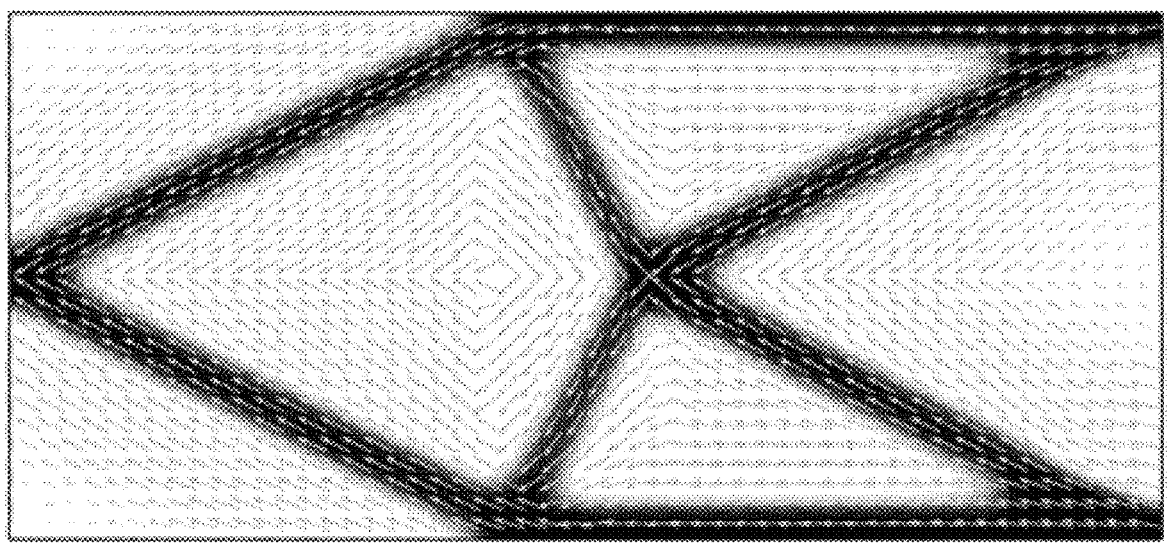
FIG. 10B shows an optimized orientation and topology for the design domain orientation in FIG. 10A.

FIGS. 10A and 10B show results for a numerical simulation when the rotation angle for the ZYX Euler angle is (0°, 30°, 90°). FIG. 10A shows the cantilever beam in the real coordinate system, and FIG. 10B shows the optimized topology/distribution and orientation. These results are referred to herein as case (g).

Figure 11A:
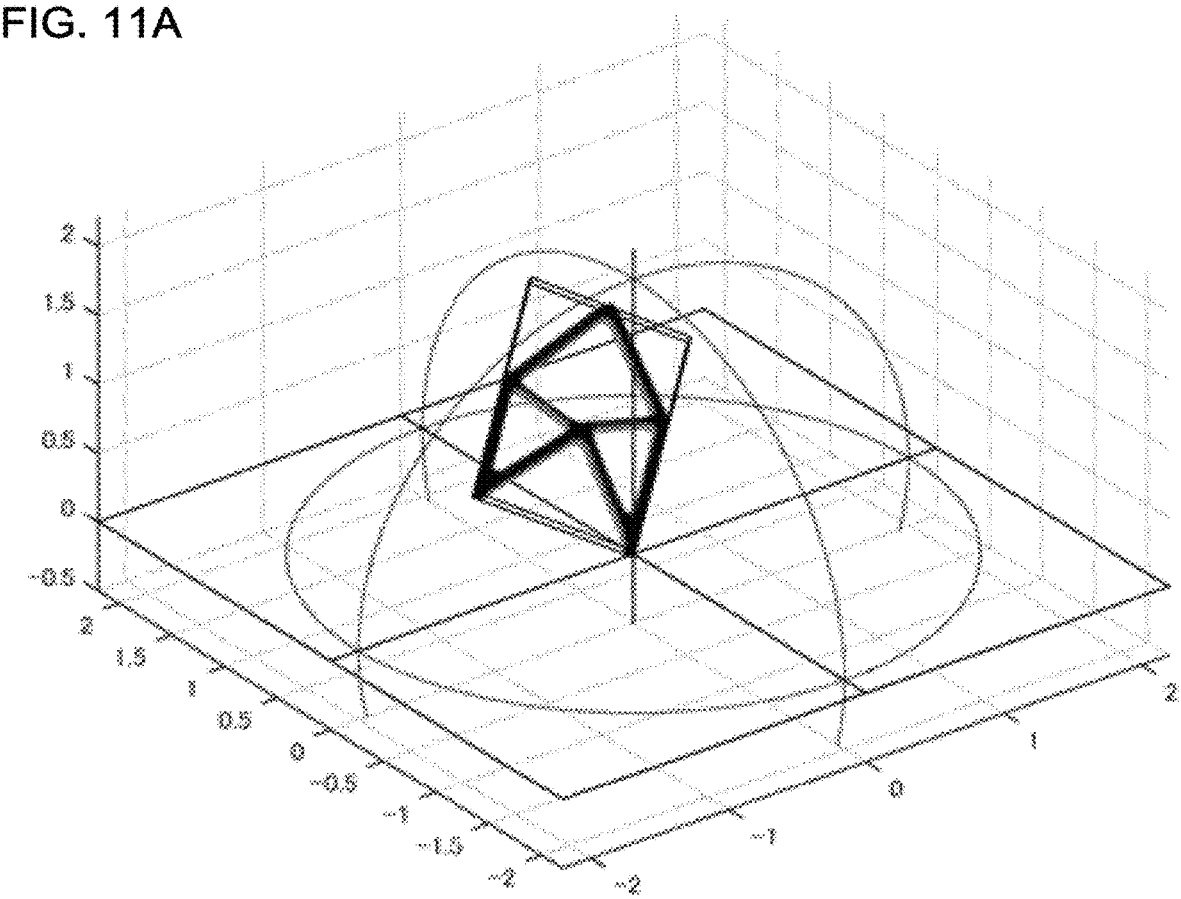
FIG. 11A shows the center loaded in-plane short cantilever beam for a design domain orientation of (43°, 12°, 24°) for the ZYX Euler angle.
Figure 11B:
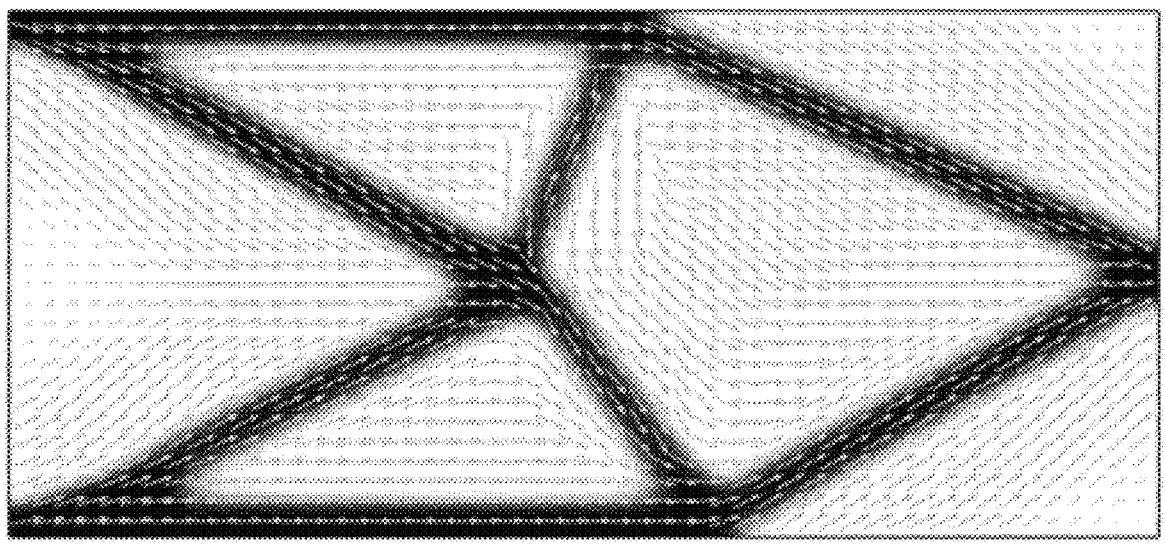
FIG. 11B shows an optimized orientation and topology for the design domain orientation in FIG. 11A.
Figure 11C:
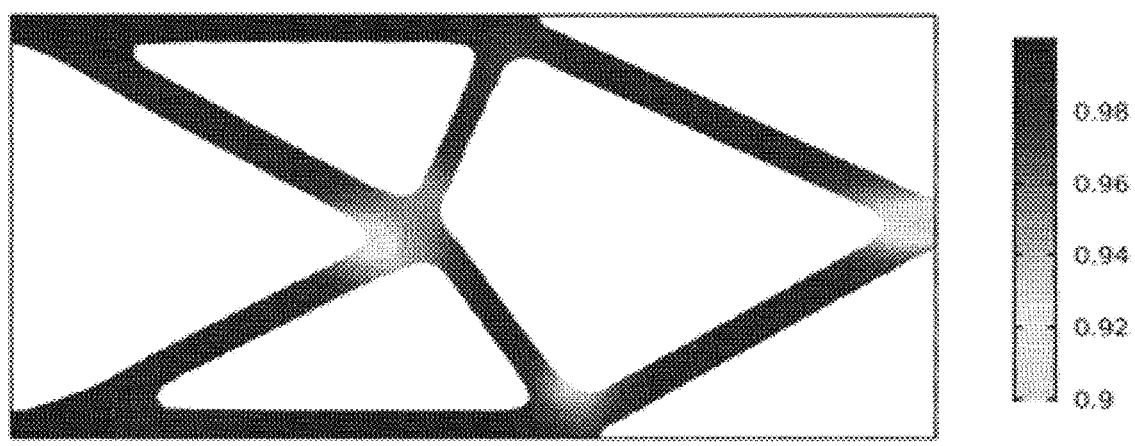
FIG. 11C shows a plot of the first tensor invariant $I_1$ for the orientation and topology corresponding to FIG. 11A.
Figure 11D:
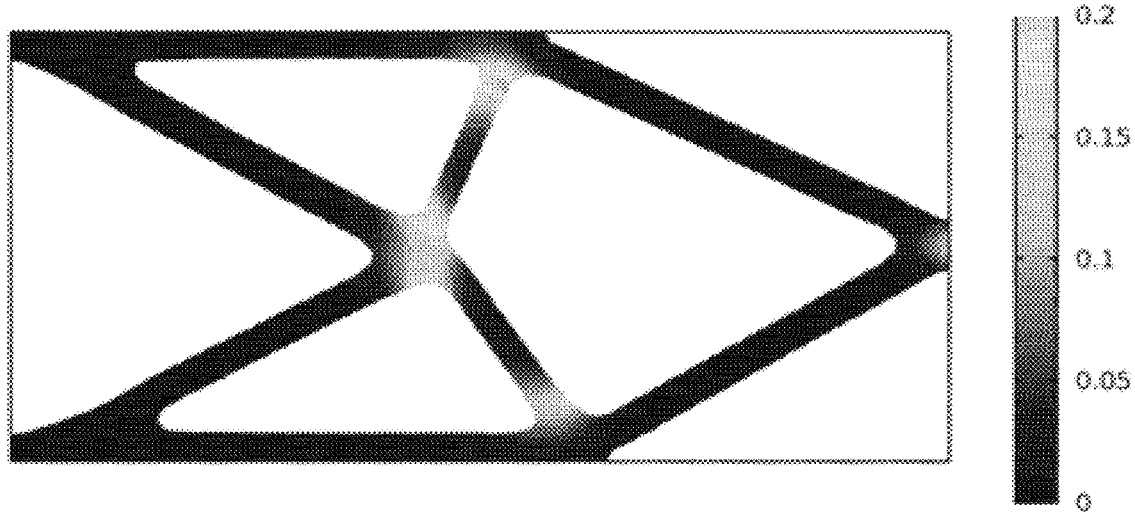
FIG. 11D shows a plot of the second tensor invariant $I_2$ for the orientation and topology corresponding to FIG. 11A.

FIGS. 11A and 11B show results for a numerical simulation when the rotation angle for the ZYX Euler angle is (43°, 12°, 24°). FIG. 11A shows the cantilever beam in the real coordinate system, and FIG. 11B shows the optimized topology/distribution and orientation. FIGS. 11C and 11D show the values for the $I_1$ and $I_2$, respectively. These results are referred to herein as case (h).

Cases (a) to (h) show various design domain orientations for the cantilever beam in the real coordinate system, and demonstrate that the method described herein is robust to the angular dependency of the design domain orientation in the real coordinate system. In these numerical simulations, the upper bound of the volume fraction is 0.25. The rotation angle for cases (a) to (h) is respectively, (0°, 0°,0°), (0°, 90°,0°), (90°, 0°,0°), (0°, 0°, 30°), (0°, 90°, 30°), (30°, 0°,0°), (0°, 30°, 90°), and (43°, 12°, 24°) in ZYX Euler angle.

No significant difference is observed in topology and objective value for all cases, thus, the method is essentially orientation independent. However, small differences can be observed in the solutions realized for different rotation-angle cases. All results show symmetric shape in plane, except for case (h), which shows minor asymmetries. Since this method handles three Cartesian axes equivalently, unlike polar axis or Euler angle based methods, cases (a), (b), and (c) show identical results in both topology and orientation distribution. Cases (d) and (e) involve out-of-plane rotation around Cartesian axes (from cases (a) and (b), while cases (f) and (g) involve in-plane rotation (from cases (a) and (b). The cases (d) and (e) show almost identical results with the ones without rotation (i.e., cases (a) and (b)), however the latter cases (e) and (f)) show minor differences in orientation at the center crossing part of the structure. This difference can be understood as being due to the misalignment of the structural in-plane symmetry axes and the Cartesian coordinate axes where the tetrahedral constraint domain is defined for the first tensor invariant constraint. In spite of this difference, the structural in-plane symmetry is still held in both cases. Note that, since cases (d) and (f) are respectively equivalent to cases (e) and (g), each pair shows identical results. Case (h) involves multiple out-of-plane rotations, and thus, it shows more differences compared to the other cases. In this case, the topology itself shows slight asymmetric distortion. This distortion can also be considered as a side effect of multi-variable function projection. This side effect should be reduced in the future work.

The figures showing the tensor invariant constraints are considered next. For all cases, $I_1$ is less than unity to satisfy the given inequality constraint. Additionally, most of the area is exactly one, which satisfies the original equality constraint for $I_1$.

Similarly, $I_2$ is zero for most of the area, which satisfies the given constraint, except for at the joint parts of the structures. The third constraint $I_3$ shows almost zero in all of the area.

As observed, the discrepancy appears at the joint points of the structural members where the orientation is changing most rapidly as a function of position. This suggests that there may be a contradiction between the continuous distribution assumption enforced by Helmholtz filtering and the actual optimum distribution of each tensor element. If the discrepancy at the joint points becomes too large, the projections in step 124 can be adjusted to more strictly enforce the second tensor invariant $I_2$. Thus, the projections in step 124 can be tuned to ensure that the second tensor invariant $I_2$ is substantially satisfied. For example, the figures show that $I_2$ is kept below a value of 0.3. Therefore it is within 30% of the desired value of zero, and the constraint is substantially satisfied.

Next, numerical simulation results for a multi-load in-plane four point bending beam problem are provided to illustrate the methods describe herein. These results for the multi-loaded in-plane four point bending beam problem illustrate and compare result for a sequential optimization of topology and orientation with results for concurrent optimization of topology together with orientation. Further, results are provided for both single loading setups and multi-loading setups. Similar to the previous example, the topology optimization problem is solved in a planar rectangular design domain with finite thickness in the three-dimensional space.

Figure 12:
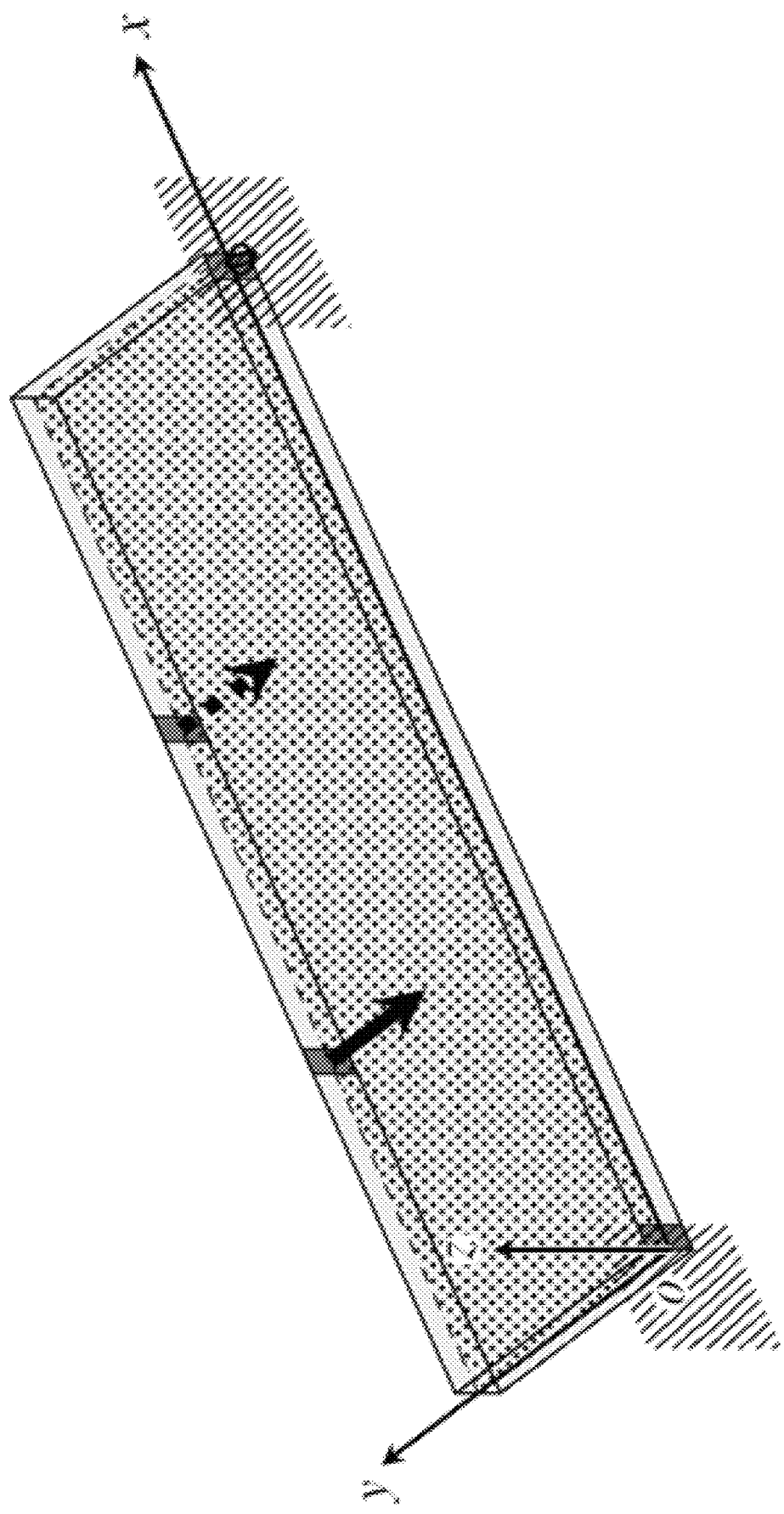
FIG. 12 shows a perspective view of a design domain and boundary conditions of a multi-load in-plane four point bending beam, according to one implementation.

FIG. 12 shows a schematic of the problem setting. The design domain is a 4×1 rectangle with 0.050 thickness, which is twice the mesh element length. On the bottom face, the left corner is fixed, which is shown as a gray box on a hatched plane in FIG. 12, and the right corner is under a roller constraint, which is shown as a gray box with a roller symbol, where displacement in the ±y direction is constrained. On the top face, two loading areas are located at every one third of the side length, which are shown as two gray boxes with arrows, where the same amount of force (0.1) is loaded in −y direction on each area.

In addition to that, both problems are solved with two different procedures. One is sequential optimization that solves the topology density design variable first and the orientation design variables after that without changing the density distribution. The other procedure is concurrent optimization that solves the topology and the orientation design variable simultaneously. The upper bound fraction of volume is set to 30% in all cases.

The problem is solved as both a single loaded problem, in which two loading points are activated in a single analysis, and a multi-loaded problem, in which each loading point is activated in each individual load case analysis. Further, the single loaded problem and the multi-loaded problem are each solved with sequential optimization and concurrent optimization. In sequential optimization, the topology density design variable is optimized first, after which the orientation design variables are optimized without changing the density distribution. In concurrent optimization, the topology and the orientation design variables are optimized simultaneously. The upper bound fraction of volume is set to 30% in all cases.

Figure 13A:
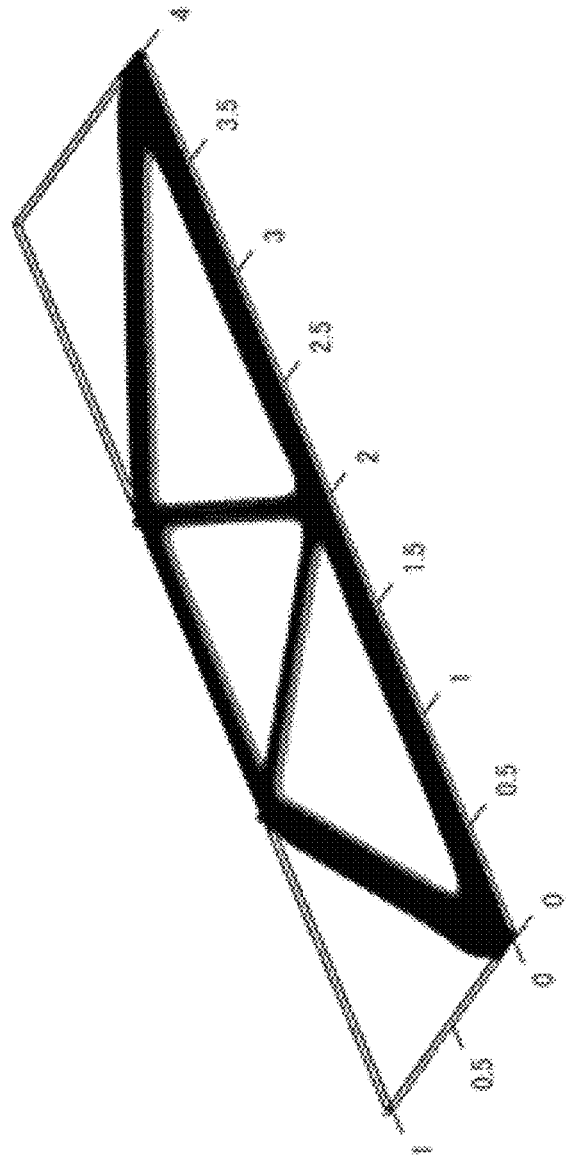
FIG. 13A shows a design domain orientation for multi-load concurrent optimization of the multi-load in-plane four point bending beam.
Figure 13B:
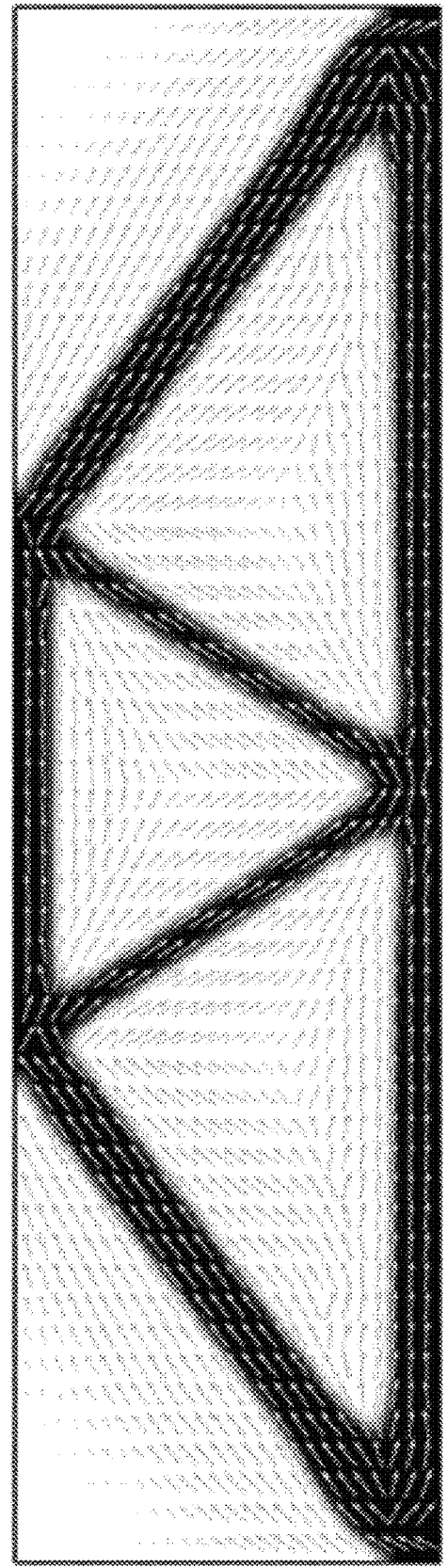
FIG. 13B shows an optimized orientation and topology for the multi-load concurrent optimization in FIG. 13A.
Figure 14A:
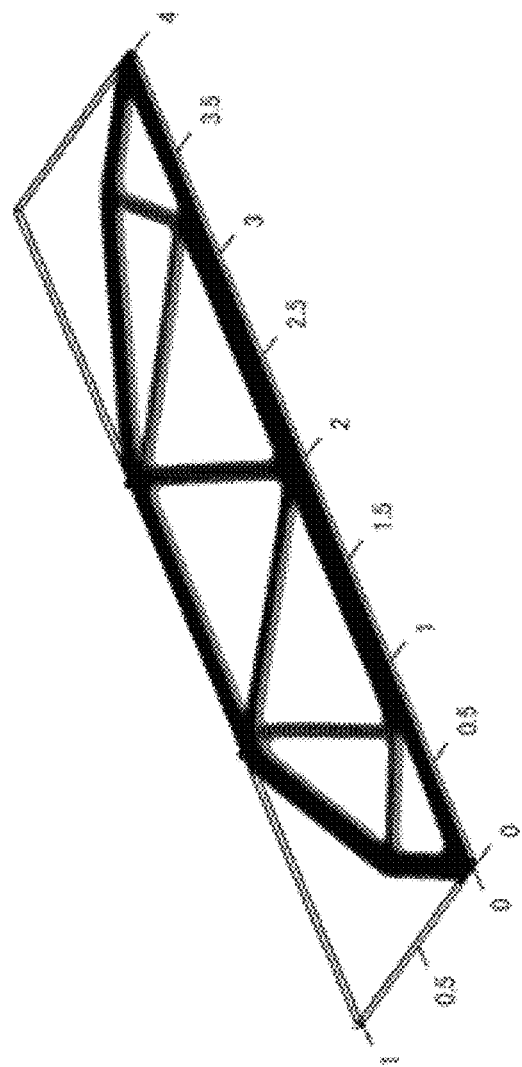
FIG. 14A shows a design domain orientation for multi-load sequential optimization of the multi-load in-plane four point bending beam.
Figure 14B:
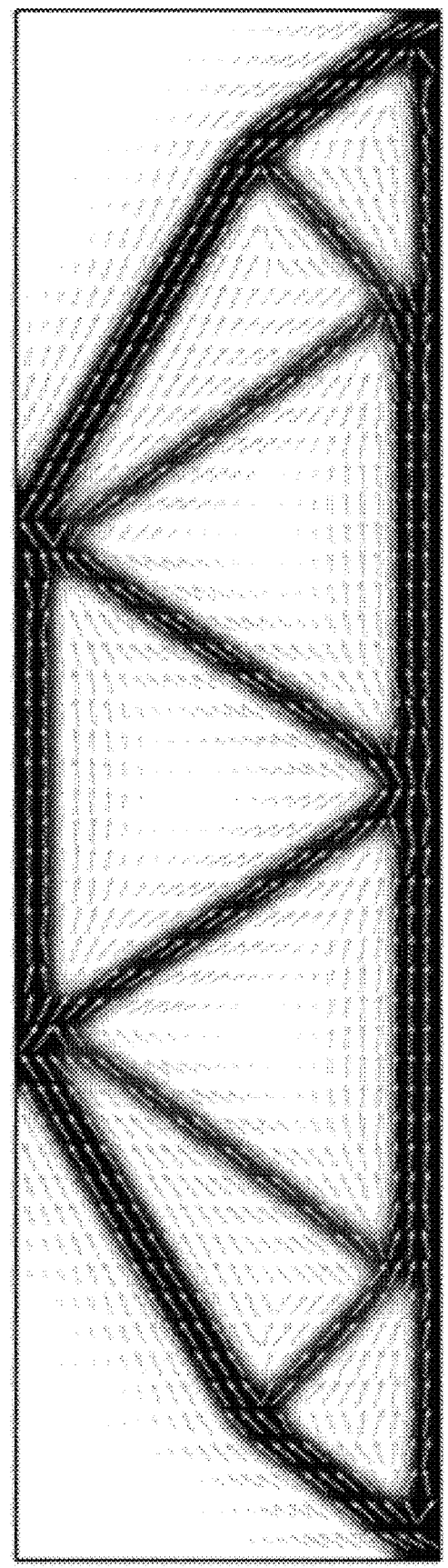
FIG. 14B shows an optimized orientation and topology for the multi-load sequential optimization in FIG. 14A.
Figure 15A:
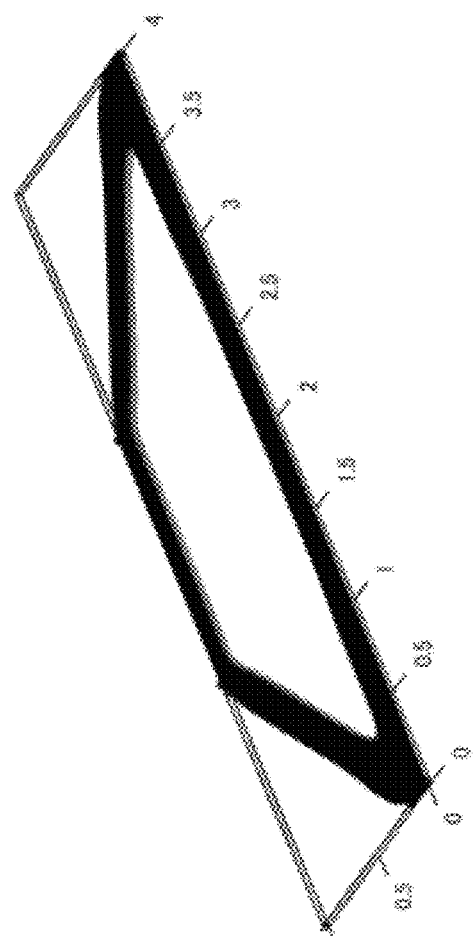
FIG. 15A shows a design domain orientation for single-load concurrent optimization of the multi-load in-plane four point bending beam.
Figure 15B:
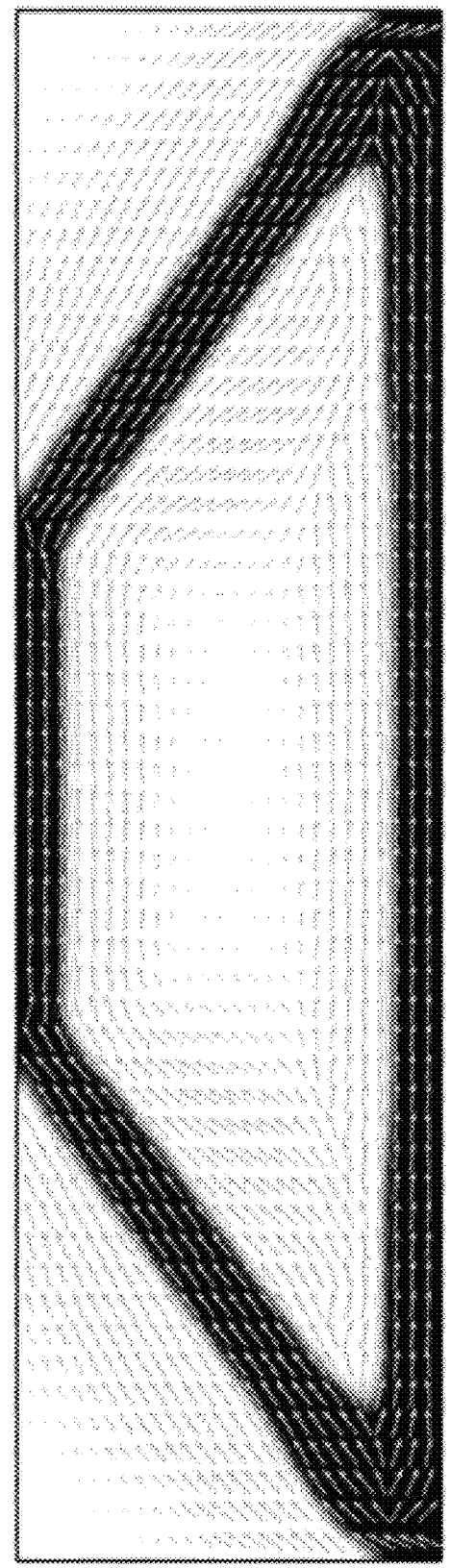
FIG. 15B shows an optimized orientation and topology for the single-load concurrent optimization in FIG. 15A.
Figure 16A:
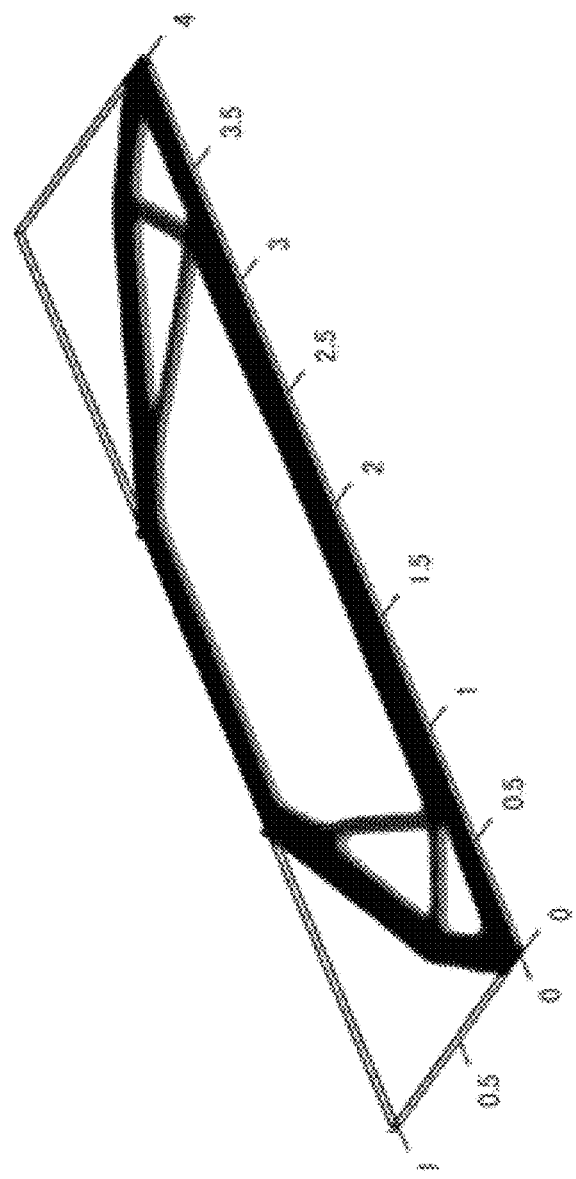
FIG. 16A shows a design domain orientation for single-load sequential optimization of the multi-load in-plane four point bending beam.
Figure 16B:
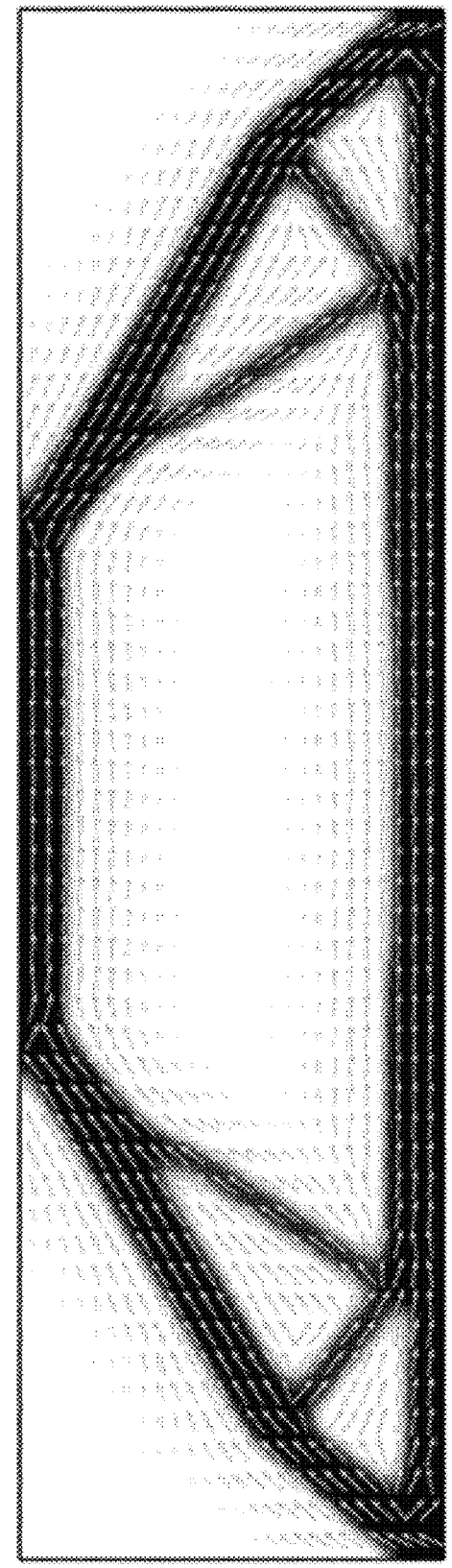
FIG. 16B shows an optimized orientation and topology for the single-load sequential optimization in FIG. 16A.

FIG. 13B shows the topology and orientation results for multi-load, concurrent optimization, and FIG. 13A shows the arrangement of the beam in the real coordinate system. This is referred to herein as case (j). FIG. 14B shows the topology and orientation results for multi-load, sequential optimization, and FIG. 14A shows the arrangement of the beam in the real coordinate system. This is referred to herein as case (k). FIG. 15B shows the topology and orientation results for single-load, concurrent optimization, and FIG. 15A shows the arrangement of the beam in the real coordinate system. This is referred to herein as case (l). FIG. 16B shows the topology and orientation results for single-load, sequential optimization, and FIG. 16A shows the arrangement of the beam in the real coordinate system. This is referred to herein as case (m).

FIGS. 13A, 14A, 15A, and 16A show the obtained topology in three-dimensional space for cases (j), (k), (l), and (m), respectively. FIGS. 13B, 14B, 15B, and 16B show two-dimensional plots of topology and orientation on the symmetry plane for cases (j), (k), (l), and (m), respectively. Case (j), (k), (l), and (m) are obtained by single loaded sequential optimization, single loaded concurrent optimization, multi-loaded sequential optimization and multi-loaded concurrent optimization, respectively. By comparing the single loading cases and the multi-loading cases, the influence on topology is observed. That is, the single loaded cases yield square unstable frames while multi-loaded cases yield triangular stable frames at the center of the structure below the two loading points. In addition to that, the sequential optimization and the concurrent optimization yield different topology in both the single loaded cases and the multi-loaded cases. The value of the objective function is 6.26 and 6.10 for case (j) and (k), respectively, and the value of the objective function is 4.63 and 4.41 for case (l) and (m). Thus, the improvement of concurrent optimization relative to sequential optimization is approximately 3% in the single load cases, and is approximately 5% in the multi-load cases.

The above illustrative numerical examples demonstrate several non-limiting implementations of method 100, and demonstrate some advantages of this method for optimizing the orientation to minimize (or maximize) and objective function. Because the tensor invariants for the orientation tensor are enforced through the mapping from the mathematical design variables to the physical design variables, the optimization method performed using the mathematical design variables is not burden with enforcing the tensor invariants via constraint equations. Thus, by removing the non-linear constraints, the optimization problem can be solved using efficient non-linear programming solvers, such as MMA and SQP.

Regarding the coordinate systems, the mathematical design variables and the physical design variables include respective orientation tensors $q_{ij}$ and $a_{ij}$, which are functions of position. Additionally, the mathematical design variables and the physical design variables can include a material density $\rho$, which is also a function of position and characterizes the topology of the component. When the physical response of the component is simulated using the physical design variables, additional coordinate systems can be introduced to numerically simulate a partial differential equation (PDE) of the system (i.e., the response of the anisotropic material to a physical input such as a load). For example, in the finite element method (FEM), an FEM mesh can be generated on a real coordinate system. This real coordinate system can be a Cartesian system, a cylindrical system, a spherical system, etc. The FEM mesh can be an arrangement of elements (e.g., hexahedral elements or tetrahedral elements) defined by vertices and edges in the real coordinate system. A natural coordinate system can also be introduced for each of the elements. For example, each hexahedral element can be mapped from the real coordinate system to a unit cube via a shape function. Generally, the natural coordinate system can be a coordinate system in which the range is normalized to extend from zero or it is defined to extend from minus unity to plus unity. Often, the natural coordinate system uses a Cartesian coordinate system for hexahedral elements and uses a bar centric coordinate system for tetrahedral elements.

The shape function performs a coordinate transformation operation that is used inside of the FEM. Each element is formulated using natural coordinate system. Each mesh element is converted by a respective shape function defined on real coordinate system. The shape function transforms a natural coordinate system to real coordinate system. Each mesh element has a respective shape function dictated according to its node positions on the real coordinate system. The shape function takes coordinate value on natural coordinate system and output coordinate value on real coordinate system. This shape function can be used to map the orientation from the orientation tensor $a_{ij}$ of the physical design variables between the real coordinate system and the natural coordinate system. That is, the shape functions used in FEM are a separate and independent mapping from the mapping of the mathematical design variables onto the physical design variables. For example, the shape function mappings do not generally impose the first and second tensor invariants, whereas the mapping of the mathematical design variables onto the physical design variables does enforce the first and second tensor invariants.

Figure 17:
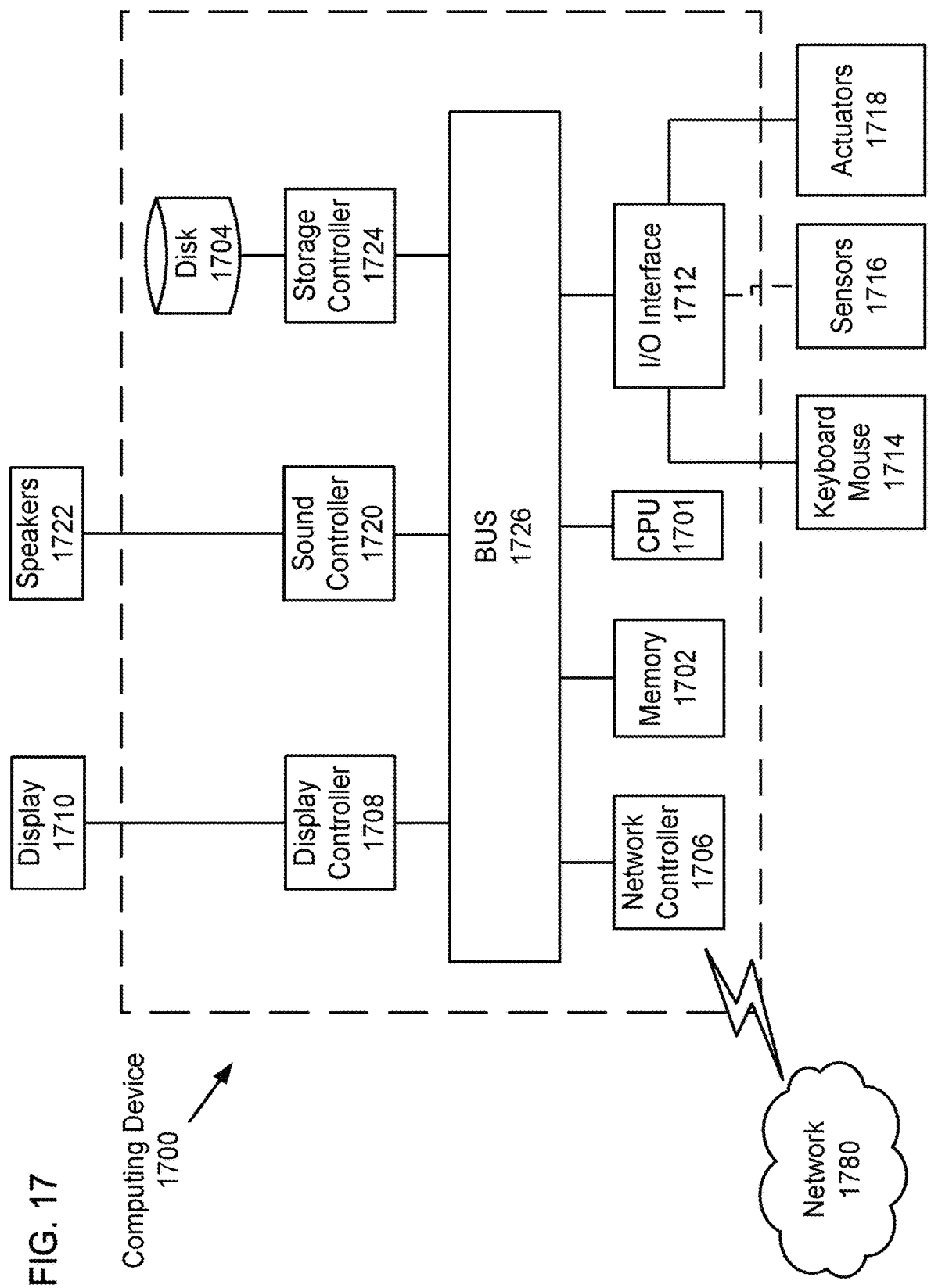
FIG. 17 shows a computing apparatus that performs method 100 optimizing the orientation of the anisotropic material within a component, according to one implementation.

Next, a hardware description is provided for a computing device 1700 that performs various steps of method 100. In FIG. 17, the Computing apparatus 1700 includes a CPU 1701 which performs the processes described above. The process data and instructions may be stored in memory 1702. These processes and instructions may also be stored on a storage medium disk 1704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the Computing apparatus 1700 communicates, such as a server or computer.

Further, the claimed advancements may be provided as a utility application, background daemon, or component of an operating system, or combination thereof, executing in conjunction with CPU 1701 and an operating system art.

CPU 1701 may be, e.g., a Xeon or Core processor from Intel of America, or may be other processor types that would be recognized by one of ordinary skill in the art. Alternatively, the CPU 1701 may be implemented on an FPGA, ASIC, PLD or using discrete logic circuits, as one of ordinary skill in the art would recognize. Further, CPU 1701 may be implemented as multiple processors cooperatively working in parallel to perform the instructions of the inventive processes described above.

The Computing apparatus 1700 in FIG. 17 also includes a network controller 1706 for interfacing with network 1780. As can be appreciated, the network 1780 can be a public network, such as the Internet, or a private network such as an LAN or WAN network, or any combination thereof and can also include PSTN or ISDN sub-networks. The network 1780 can also be wired, such as an Ethernet network, or can be wireless such as a cellular network. The wireless network can also be WiFi, Bluetooth, or any other wireless form of communication.

The Computing apparatus 1700 further includes a display controller 1708 for interfacing with display 1710, such as a liquid crystal display (LCD) monitor or an organic light emitting diode (OLED) screen. A general purpose I/O interface 1712 interfaces with a keyboard and/or mouse 1714 as well as a touch screen panel 1716 on or separate from display 1710. General purpose I/O interface also connects to a variety of sensors 1716 and actuators 1718. For example, the sensors 1716 and actuators 1718 can be a robotic mechanisms that performs Automated Fiber Placement (ATP), Tailored Fiber Placement (TFP), or continuous Fiber Printing (CFP).

A sound controller 1720 is also provided in the Computing apparatus 1700, such as Sound Blaster Z sound card from Creative, to interface with speakers/microphone 1722 thereby providing sounds and/or music.

The general purpose storage controller 1724 connects the storage medium disk 1704 with communication bus 1726, which may be a PCI express (PCI-e), Hypertransport (HT), ISA, EISA, VESA, PCI, ACG, or similar, for interconnecting all of the components of the Computing apparatus 1700. A description of the general features and functionality of the display 1710, keyboard and/or mouse 1714, as well as the display controller 1708, storage controller 1724, network controller 1706, sound controller 1720, and general purpose I/O interface 1712 is omitted herein for brevity as these features are known.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. A method comprising:
designing a component, which comprises an anisotropic material, by optimizing, as a function of position, an orientation of the anisotropic material, the designing comprising:
  initializing mathematical design variables, the mathematical design variables including a first orientation tensor;
  mapping the first orientation tensor to a second orientation tensor of physical design variables, wherein the mapping ensures that the second orientation tensor substantially satisfies a first constraint independently of whether the first orientation tensor satisfies the first constraint;
  calculating, using the physical design variables, a value of an objective function F, which represents a quantity to be optimized, by simulating a performance of the component when the anisotropic material is oriented according to the second orientation tensor; and
  iteratively adjusting the mathematical design variables to optimize the value of the objective function F, the first constraint being indirectly imposed on the optimization of the value of the objective function F through the mapping from the mathematical design variables to the physical design variables rather than being directly applied to the mathematical design variables,
  wherein the mapping of the first orientation tensor to the second orientation tensor includes that
    the mapping ensures that the second orientation tensor substantially satisfies a second constraint,
    the first constraint is a constraint on diagonal elements of the second orientation tensor, and
    the second constraint is a constraint on off-diagonal elements of the second orientation tensor; and
  fabricating the component with the optimized orientation of the anisotropic material of the component based on the designing, the component being fabricated using a structure made of a fiber composite in which a fiber axis varies spatially point-to-point in the structure by controlling spatially varying material orientation with robotic based mechanisms based on the optimized orientation of the anisotropic material of the component.

2. The method according to claim 1 in which the anisotropic material is a uniaxial material for which a material property has a unique value in a first direction and is isotropic in another two dimensions, wherein,
the mapping of the first orientation tensor to the second orientation tensor includes that the second orientation tensor is a self-dyadic product of a direction vector corresponding to the first direction of the uniaxial material, and
the first constraint provides an upper bound of an l2-norm of the direction vector.

3. The method according to claim 1, wherein the component is a rigid mechanical structure that supports a load, and the anisotropic material is a fiber composite,
calculating the value of the objective function F further includes simulating a response of the component to an application of the load, and the objective function F represent a stiffness or a compliance of the component, and
iteratively adjusting the mathematical design variables includes that the mathematical design variables include the first orientation tensor that determine the second orientation tensor, which represents an orientation of fiber in the fiber composite.

4. The method according to claim 3, wherein iteratively adjusting the mathematical design variables further includes that the mathematical design variables include material distribution variables representing a topology of the component.

5. The method according to claim 4, wherein iteratively adjusting the mathematical design variables further includes that the material distribution variables and the first orientation tensor are adjusted concurrently to optimize the value of the objective function F.

6. The method according to claim 1, wherein iteratively adjusting the mathematical design variables further includes analyzing a sensitivity of the value of the objective function F to respective combinations of changes to the mathematical design variables, and iteratively updating the mathematical design variables for a combination of changes to the mathematical design variables for which the value of the objective function F is estimated to be sensitive.

7. The method according to claim 1, wherein iteratively adjusting the mathematical design variables is performed using a non-linear programming method, a sequential quadratic programming method, a sequential linear programming method, a convex-linearization method, a moving asymptotes algorithm method, augmented Lagrangian method, or a primal-dual method.

8. The method according to claim 1, wherein calculating the value of the objective function F further includes that simulating the physical performance of the component is performed by numerically simulating a partial differential equation for one of a structural mechanics problem, electromagnetics problem, heat transfer problem, thermal-structural problem, and a magnetic-thermal-fluid problem.

9. The method according to claim 1, wherein mapping the first orientation tensor to the second orientation tensor of physical design variables further includes
performing a first projection in which a hexahedral isoparametric shape function maps a hexahedral shape in a space of the mathematical design variables to a tetrahedral shape in a space of the physical design variables.

10. The method according to claim 9, wherein mapping the first orientation tensor to the second orientation tensor of physical design variables further includes
performing a second projection for off-diagonal elements of the second orientation tensor in which each off-diagonal element is based on a geometric mean of respective diagonal elements of the second orientation tensor corresponding to each off-diagonal element.

11. The method according to claim 10, wherein performing the second projection further includes applying a modified Heaviside function or a differentiable ramp function to off-diagonal elements of the first orientation tensor.

12. The method according to claim 1, wherein mapping the first orientation tensor to the second orientation tensor of physical design variables further includes performing a first projection in a domain of the natural coordinate system.

13. The method according to claim 4, wherein iteratively adjusting the mathematical design variables further includes that the material distribution variables and the first orientation tensor are adjusted sequentially to optimize the value of the objective function F.

14. The method according to claim 1, wherein calculating the value of the objective function F includes using the second orientation tensor to calculate an anisotropic property of the anisotropic material, the anisotropic property being one of a Young's modulus, an electrical conductivity, a thermal conductivity, a magnetic permeability, an electrical permittivity, a piezoelectricity, a ferroelectricity, a pyro electricity, a tensile strength, a shear strength, a wear rate, and a thermal expansion.

15. The method according to claim 1, wherein calculating the value of the objective function F includes using the second orientation tensor to calculate an elasticity of a uniaxial solid that is the anisotropic material, the elasticity being represented using an elastic tensor Cu that is a transverse isotropic, and the objective function F representing a stiffness/compliance of a loadbearing member.

16. The method according to claim 1, wherein iteratively adjusting the mathematical design variables is performed with fewer constraints relative to a case in which optimization is performed directly on the physical design variables by iteratively adjusting the physical design variables to optimize the value of the objective function F.

17. A method comprising:
selecting an orientation of an anisotropic material comprising a component, the selecting comprising:
defining one or more design constraints of first design values a geometric domain associated with the component element, the first design values corresponding to the orientation of the anisotropic material;
applying an isoparametric shape function that maps second design values onto the first design values such that the one or more design constraints are substantially satisfied and nonlinear constraints are removed; and
performing a topology optimization using the second design values without directly accounting for the one or more design constraints, the one or more design constraints being indirectly accounted for via the isoparametric shape function applied to map the second design values to the first design values,
wherein the one or more design constraints includes a first constraint on diagonal elements of the second design values, and a second constraint on off-diagonal elements of the second design values; and
fabricating the anisotropic material with the selected orientation, the anisotropic material being fabricated using a structure made of a fiber composite in which a fiber axis varies spatially point-to-point in the structure by controlling spatially varying material orientation with robotic based mechanisms based on the selected orientation.

18. The method according to claim 17, wherein defining the one or more design constraints includes that the one or more design constraints include a non-linear constraints that normalizes a Euclidean length of direction vector.

19. The method according to claim 17, wherein defining the one or more design constraints includes that the first design values design represent a normalized direction vector corresponding to the orientation of the anisotropic material, the normalized direction vector varying as a function of position within the component.

20. An apparatus comprising:
circuitry that designs a component, which comprises an anisotropic material, by optimizing, as a function of position, an orientation of the anisotropic material, the circuitry configured to
initialize mathematical design variables, the mathematical design variables including a first orientation tensor,
map the first orientation tensor to a second orientation tensor of physical design variables, wherein the mapping ensures that the second orientation tensor substantially satisfies a first constraint independently of whether the first orientation tensor satisfies the first constraint,
calculate, using the physical design variables, a value of an objective function F, which represents a quantity to be optimized, by simulating a performance of the component when the anisotropic material is oriented according to the second orientation tensor, and
iteratively adjust the mathematical design variables to optimize the value of the objective function F, the first constraint being indirectly imposed on the optimization of the value of the objective function F through the mapping from the mathematical design variables to the physical design variables rather than being directly applied to the mathematical design variables,
wherein the mapping of the first orientation tensor to the second orientation tensor includes that
the mapping ensures that the second orientation tensor substantially satisfies a second constraint,
the first constraint is a constraint on diagonal elements of the second orientation tensor, and
the second constraint is a constraint on off-diagonal elements of the second orientation tensor; and
a fabrication tool configured to fabricate a component having an optimized orientation of the anisotropic material determined by the circuitry, the fabrication tool being configured to fabricate the component using a structure made of a fiber composite in which a fiber axis varies spatially point-to-point in the structure by controlling spatially varying material orientation with robotic based mechanisms based on the optimized orientation of the anisotropic material determined by the circuitry.

* * * * *